United States Patent
Young

(10) Patent No.: US 11,350,641 B2
(45) Date of Patent: Jun. 7, 2022

(54) METHOD FOR INCREASING THE SHELF LIFE OF FRUIT

(71) Applicant: WESTFALIA FRUIT INTERNATIONAL LIMITED, Kent (GB)

(72) Inventor: Graham Alexander Young, Kent (GB)

(73) Assignee: WESTFALIA FRUIT INTERNATIONAL LIMITED, West Malling (GB)

( * ) Notice: Subject to any disclaimer, the term of this patent is extended or adjusted under 35 U.S.C. 154(b) by 0 days.

(21) Appl. No.: 16/621,736

(22) PCT Filed: Jun. 12, 2018

(86) PCT No.: PCT/GB2018/051592
§ 371 (c)(1),
(2) Date: Dec. 12, 2019

(87) PCT Pub. No.: WO2018/229472
PCT Pub. Date: Dec. 20, 2018

(65) Prior Publication Data
US 2020/0100513 A1  Apr. 2, 2020

(30) Foreign Application Priority Data

Jun. 12, 2017 (GB) .................................... 1709333

(51) Int. Cl.
*A23B 7/015* (2006.01)
*A23B 7/152* (2006.01)
(Continued)

(52) U.S. Cl.
CPC .............. *A23B 7/015* (2013.01); *A23B 7/152* (2013.01); *A23L 3/28* (2013.01); *B65B 25/041* (2013.01);
(Continued)

(58) Field of Classification Search
CPC ......... A23B 7/015; A23B 7/152; A23B 7/148; A23L 3/28; A23L 3/3418; A23L 3/3445;
(Continued)

(56) References Cited

U.S. PATENT DOCUMENTS 2,401,131 A * 5/1946 Bensel ...................... A23L 3/28
426/234
6,060,136 A * 5/2000 Patrick ................... B32B 27/18
426/127

(Continued)

FOREIGN PATENT DOCUMENTS

| CN | 102217668 | 10/2011 |
| CN | 103392788 | 11/2013 |

(Continued)

OTHER PUBLICATIONS

The International Search Report (ISR) with Written Opinion for PCT/GB2018/051592 dated Sep. 7, 2018, pp. 1-10.
(Continued)

*Primary Examiner* — Drew E Becker
(74) *Attorney, Agent, or Firm* — McDonnell Boehnen Hulbert & Berghoff LLP

(57) ABSTRACT

The present invention relates a method for increasing the shelf life of fruit comprising the steps of: treating a fruit with UV light from a UV light source, packaging the fruit in packaging film that allows the fruit to be stored in a modified atmosphere within said film, and storing the packaged fruit.

10 Claims, 18 Drawing Sheets

(51) Int. Cl.

| | |
|---|---|
| *A23L 3/28* | (2006.01) |
| *B65B 25/04* | (2006.01) |
| *B65B 31/02* | (2006.01) |
| *B65D 65/42* | (2006.01) |
| *B65D 81/20* | (2006.01) |
| *B65D 85/34* | (2006.01) |

(52) U.S. Cl.
CPC ............ *B65B 31/024* (2013.01); *B65D 65/42* (2013.01); *B65D 81/2084* (2013.01); *B65D 85/34* (2013.01); *A23V 2002/00* (2013.01)

(58) Field of Classification Search
CPC ................ B65B 25/041; B65B 31/024; B65B 25/04–25/048; B65D 65/42; B65D 81/2084; B65D 85/34; B65D 81/2069; A23V 2002/00
See application file for complete search history.

(56) References Cited

U.S. PATENT DOCUMENTS

| | | | |
|---|---|---|---|
| 6,880,748 | B2 | 4/2005 | Machado et al. |
| 6,912,828 | B1* | 7/2005 | Yamay ................ B29C 66/8322 53/432 |
| 7,597,240 | B2 | 10/2009 | Machado |
| 8,754,385 | B1* | 6/2014 | Gutman ..................... A61L 2/24 250/455.11 |
| 9,034,251 | B1 | 5/2015 | Gutman |
| 2002/0155027 | A1 | 10/2002 | Gutman |
| 2003/0091705 | A1* | 5/2003 | Lidster ................... A23B 7/148 426/316 |
| 2003/0198716 | A1* | 10/2003 | Hankinson ............. A23B 7/144 426/248 |
| 2004/0005390 | A1 | 1/2004 | Newman |
| 2005/0244546 | A1* | 11/2005 | Steffen ............... B65D 81/2076 426/106 |
| 2006/0008400 | A1* | 1/2006 | Gutman ................... A61F 13/00 422/292 |
| 2006/0127545 | A1* | 6/2006 | Newman .................. A23B 4/16 426/326 |
| 2007/0059410 | A1* | 3/2007 | Steffen ................... A23L 3/3409 426/236 |
| 2008/0063757 | A1* | 3/2008 | Navarro Ruiz ....... B65B 25/041 426/118 |
| 2008/0166694 | A1* | 7/2008 | Weber ................ B65D 81/2069 435/1.1 |
| 2009/0238934 | A1* | 9/2009 | Lingham ................ A23B 7/157 426/268 |
| 2009/0311392 | A1* | 12/2009 | Newman ............... A23L 3/3454 426/248 |
| 2010/0034928 | A1* | 2/2010 | Paleari ..................... B41M 7/02 426/87 |
| 2010/0183779 | A1* | 7/2010 | Felix ....................... A23B 7/015 426/231 |
| 2013/0323375 | A1* | 12/2013 | Takahashi .............. A23B 7/015 426/248 |
| 2015/0147449 | A1* | 5/2015 | Johnson ................ B65B 31/028 426/395 |
| 2015/0289528 | A1* | 10/2015 | Gooden .................. F25D 23/00 99/467 |
| 2015/0305396 | A1* | 10/2015 | Cottone ................ B65B 31/028 426/248 |
| 2016/0088868 | A1* | 3/2016 | Dobrinsky .............. A23L 3/28 250/492.1 |
| 2016/0235080 | A1* | 8/2016 | Ayala Gil ............. A23B 7/015 |
| 2017/0209607 | A1* | 7/2017 | Safraoui ................... A61L 2/10 |
| 2017/0275078 | A1* | 9/2017 | Lidster ................... B65D 51/28 |
| 2020/0163351 | A1* | 5/2020 | Vigano' ................. B32B 27/08 |
| 2021/0329933 | A1* | 10/2021 | Young ....................... A23B 7/04 |

FOREIGN PATENT DOCUMENTS

| | | |
|---|---|---|
| CN | 107079979 | 11/2013 |
| CN | 103564308 | 2/2014 |
| EP | 2563674 | 4/2016 |
| EP | 3037003 | 6/2016 |
| GB | 2365749 | 2/2002 |
| GB | 2433485 | 6/2007 |
| WO | 2012049005 | 4/2012 |
| WO | 2014018399 | 1/2014 |
| WO | 2014089456 | 12/2014 |
| WO | 2016146623 | 9/2016 |
| WO | 2018210955 | 11/2018 |
| WO | 2018229472 | 12/2018 |

OTHER PUBLICATIONS

Hass Avocado Board, How to Pick & Buy Hass Avocados/Hass Avocado, downloaded Jan. 3, 2017 https://www.avocadocentral.com/how-to/how-to-pick-how-to-buy-avocados.
Allende A. et al. "Combined ultraviolet-C and modified atmosphere packaging treatments for reducing microbial growth of fresh processed lettuce" Lebensm.-Wiss. U.-Technol. (2003) vol. 36, pp. 779-786.
Berrios, Jose De J "Development of a Dynamically Modified Atmosphere Storage System Applied to Avocados" Food Science and Technology International (2002) vol. 8(3), pp. 155-162.
Chauhan O.P. et al. "Modified Atmosphere Packaging of Banana (cv. Pachbale) with Ethylene, Carbon di-oxide and Moisture Scrubbers and Effect on its Ripening Behaviour" American Journal of Food Technology (2006) vol. 1(2), pp. 179-189.
Gonzalez, G et al. "Modified atmosphere packaging (MAP) of mango and avocado fruit" Acta Horticulturae, Tropical Fruit in International Trade (1990) vol. 269, pp. 335-344.
Hinojosa, Andrea et al. "Effect of the Combined Treatment of UV-C Light and Modified Atmosphere Packaging on the Inactivation of *Escherichia coli* Inoculated Watercress" Journal of Food Processing and Preservation (2015) vol. 39(6), pp. 1525-1533.
Illeperuma, C.K. et al. "Modified atmosphere packaging of minimally processed avocado cv. 'Booth'" 7 The Journal of Horticulture Science and Biotechnology (2006) vol. 81(4), pp. 607-612.
Mahendran, T. et al. "Modified atmosphere storage of avocados: effects on storage life and fruit quality" Sabaragamuwa University Journal (2008), pp. 29-39.
Meir, Shimon et al. "Prolonged storage of "Hass" avocado fruit using modified atmosphere packaging" Postharvest Biology and Technology (1997) vol. 12, pp. 51-60.
Rodrigues,Bruna Leal et al. "Influence of vacuum and modified atmosphere packaging in combination with UV-C radiation on the shelf life of rainbow trout (*Oncorhynchus mykiss*) fillets" Food Control (2016) vol. 60, pp. 596-605.
Soltani, Mahmoud et al. "Modified atmosphere packaging: a progressive technology for shelf-life extension of fruits and vegetables" Journal of Applied Packaging Research (2015) vol. 7(3), pp. 33-59.
Vunnam R et al. "Physico-chemical changes in tomato with modified atmosphere storage and UV treatment" J Food Sci Technol (2014) vol. 51(9), pp. 2106-2112.
Guerrero, J.A. et al. "Review: Advantages and limitation on processing foods by UV light" Food Science and Technology International (2004) vol. 10(3), pp. 137-147.
Koutchma, Tatiana N. et al. "Ultraviolet light in food technology Principles and Applications" Contemporary Food Engineering (2009), pp. 1-32.
Meir, S. et al. "Modified atmosphere packing enables prolonged storage of Fuerte avocado fruit" Acta Horticulturae 464 (1998), pp. 397-402.
Whiley, A.W. et al. "The Avocado Botany, production and uses" CABI Publisher (2002), pp. 366-388. Supplied by the British Library Nov. 27, 2019, 12:12 (GMT).
Combined Search and Examination Report under Section 17 and 18(3) for United Kingdom Application No. GB1709333.7 dated Jul. 7, 2017, pp. 1-7.

(56) References Cited

OTHER PUBLICATIONS

Database WPI Week 201768 Thomson Scientific, London, GB; AN 2017-59294R XP002784519, pp. 1-2, Mar. 2017.

AgroFresh. SmartFresh Post-Harvest Treatment from AgroFresh. Downloaded Jan. 14, 2022. www.agrofresh.com/solutions/smartfresh/.

Dogan A et al., "UV-C illumination maintains postharvest quality of minimally processed broccoli florets under modified atosphere packaging", Acta Horticulturae, Mar. 1, 2018, No. 1194, pp. 537-544.

Flair. Oxygen Transmission Rate (OTR). Downloaded Jan. 14, 2022. https://www.flairpackaging.com/pages/home/resources/packaging_101/OxygenTransferRate(OTR)/1.

Holman et al., "Harvesting and Postharvest", in Whiley A W et al (eds) "The Avocado: botany, production and uses", CABI Publishing, 2nd edition, 2013 pp. 492-499.

\* cited by examiner

METHOD FOR INCREASING THE SHELF LIFE OF FRUIT

CROSS REFERENCE TO RELATED APPLICATIONS

This application is a national stage application under 35 U.S.C. § 371 of International Application No. PCT/GB2018/051592, filed Jun. 12, 2018, which claims the benefit of priority from Great Britain Application No. GB 1709333.7, filed Jun. 12, 2017. The disclosures of all of the above applications are incorporated by reference herein in their entireties.

FIELD OF THE INVENTION

The present invention relates to a method for extending the shelf life of avocados. In particular, it relates to a method for extending the shelf life of avocados, which may be ready-to-eat, which are stored at a chilled or ambient temperature.

BACKGROUND TO THE INVENTION

The avocado (*Persea americana*) belongs to the family Lauraceae (which also include the bay laurel) and is one of the major fruit crops in the world. It is native to Central America but is grown in tropical and sub-tropical regions of the world. The demand for this fruit is high as a result of (i) increased consumer awareness of the fruits dietary value and uses (ii) improved fruit quality resulting from the implementation of maturity standards and important storage and transportation facilities (Naiman & Hyman, 2007: 397-402). The fruit has a markedly higher fat content than most other fruits, mostly monounsaturated fat. It is used as the base for the Mexican dip known as guacamole and also used in the preparation of chocolate syrup, ice-cream, milk-shakes and other dessert drinks (Whiley et al., 2002: 366-388).

Import of avocado fruit from distant markets can be difficult since table-ripe soft avocado cannot be shipped, or stored, for more than a day or two. Traditionally, avocados were shipped "firm" to be ripened by the consumer after purchase. However, there is a growing consumer need for "ready-to-eat" avocados, i.e. avocado that is packaged "ripe" and thus can be consumed by the customer without further ripening. This can lead to logistical problems for retailers as having a large stock of short-term ripe fruit (i.e. one that has a short shelf life) has the potential for a large amount of wastage during even short periods of low sale. As well as causing environmental issues due to the subsequent disposal of rotten fruit, this is also costly in monetary terms for the retailer.

UV radiation, in particular UV-C radiation, is a technology used in food processing to improve the safety and extend the shelf life of food products by inactivating pathogenic and spoilage-related microorganisms on food surfaces (Guerrero-Beltrán & Barbosa-Cánovas (2004) Food Science and Technology International, 10, 137-147). The wavelength range found to obtain a germicidal effect is often quoted as around 220-300 nm. The germicidal effect is attributed to injuries in the DNA of microorganisms caused by the absorption of the UV-C radiation leading to disruption of cell growth (Koutchma, Forney, & Moraru (2009) In T. Koutchma, L. Forney, & C. Moraru (Eds.), Ultraviolet light in food technology (pp. 1-32). Boca Raton, Fla.; CRC Press.). However, UV-C irradiation is generally not sufficient on its own to significant increase shelf-life of fruit.

Conventional devices, such as refrigeration and Modified Atmosphere Packaging (MAP), have been use to extend the shelf life of fruits, vegetables, floral and other perishable products. Examples of such conventional devices related to MAP are disclosed in U.S. Pat. Nos. 6,880,748 and 7,597,240. The basic idea of the MAP technique relating to fresh fruits and vegetable is the replacement or modification of the air of packaging headspace with a predetermined atmospheric gases different in proportion from that of air. Modified atmosphere conditions are typically exemplified by low $O_2$ and high $CO_2$ concentrations relative to that of air. This is known to slow down respiration and ripening of packaged fruits. While these systems are also known for use with avocados, it is traditionally used in combination with e.g. refrigeration in order to allow for further retardation of ripening and long-term storage. (Meir et al. (1997) Postharvest Biology and Technology 12, 51-60). However, the use of refrigeration is costly due to the high energy demand, and can cause further environmental issues.

Thus, there is a need to increase the shelf life of ripe fruit, such as avocado, especially when stored at an ambient temperature (~14-20° C.) when refrigeration would not be economically or energy efficient.

SUMMARY OF ASPECTS OF THE INVENTION

As shown in the present Examples, the present inventors have discovered that the combined use of UV irradiation and packaging that results in a modified atmosphere with respect to air can lead to a synergistic effect on the shelf-life of fruits, such as avocado. In particular, the methods and apparatus of the present invention are useful in increasing the shelf-life of ready-to-eat avocados, especially those stored at an ambient temperature.

In a broad aspect, the present invention relates to a method of increasing the shelf life of fruit comprising the steps of: treating a fruit to reduce the presence of pathogens; packaging the fruit in packaging covering that allows the fruit to be stored in a modified atmosphere within said covering; and storing the packaged fruit; wherein the method is capable of increasing the shelf life of the packaged fruit by at least 1 day or 2 days when the packaged fruit is stored at an ambient temperature and/or wherein the method is capable of increasing the shelf life of the packaged fruit by at least 3 days or 5 days or 7 days or 10 days when the packaged fruit is stored at a chilled temperature.

In this broad aspect, the step of reducing the presence of pathogens includes appropriate means for destroying and/or removing and/or inactivating said pathogens. One way of achieving the step of reducing the presence of pathogens includes the use of UV light. In the following description UV light is mentioned. In this respect, said statements regarding same relate to the general use of any appropriate means for reducing the presence of pathogens as well as the use of a step that comprises the use of UV. Preferably, the said statements relate to the use of a step that comprises the use of UV.

In this broad aspect, the covering can be any suitable covering or housing, such as a film. In the following description film is mentioned. In this respect, said statements regarding same relate to the general use of any appropriate means for covering the fruit as well as the use of a film. Preferably, the said statements relate to the use of a film.

In a broad aspect, the present invention also provides a fruit prepared by the method according to the present invention.

Accordingly, in a first aspect, the present invention provides a method for increasing the shelf life of fruit comprising the steps of:
  i) treating a fruit with UV light from a UV light source,
  ii) packaging the fruit in packaging film that allows the fruit to be stored in a modified atmosphere within said film, and
  iii) storing the packaged fruit,
wherein the method is capable of increasing the shelf life of the packaged fruit by at least 1 day or 2 days when the packaged fruit is stored at an ambient temperature and/or
wherein the method is capable of increasing the shelf life of the packaged fruit by at least 3 days or 5 days or 7 days or 10 days when the packaged fruit is stored at a chilled temperature.

In one aspect of the method of the invention, the film is a modified atmosphere packaging (MAP) film.

In one aspect of the method of the invention, the modified atmosphere has a reduced $O_2$ concentration compared to the environment surrounding the packaged fruit.

In one aspect of the method of the invention, the modified atmosphere has an increased $CO_2$ concentration compared to the environment surrounding the packaged fruit.

In one aspect of the method of the invention, the modified atmosphere comprises ozone. Ozone can provide a further sterilising effect to the packaged fruit.

In one aspect, the method of the invention comprises a further step of introducing ozone into the modified atmosphere.

In another aspect of the method of the invention, the method comprises a further step of treating the fruit with UV light from a UV light source to generate ozone. For example, the fruit is treated with UV light having a wavelength of between about 100 nm and about 240 nm.

In one aspect of the method of the invention the MAP film has an oxygen transmission rate (OTR) of about 20000 cc/m$^2$/day to about 80000 cc/m$^2$/day.

In one aspect of the method of the invention the MAP film has an oxygen transmission rate (OTR) of about 20000 cc/m$^2$/day to about 60000 cc/m$^2$/day. Preferably the MAP film has an oxygen transmission rate (OTR) of about 30000 cc/m$^2$/day to about 45000 cc/m$^2$/day, or about 35000 cc/m$^2$/day to about 40000 cc/m$^2$/day. More preferably the MAP film has an oxygen transmission rate (OTR) of about 38000 cc/m$^2$/day.

In one aspect of the method of the invention the modified atmosphere in the package headspace comprises from about 8% to about 17% $O_2$ and/or from about 4% to about 13% $CO_2$ after 10 days storage at an ambient temperature.

In one aspect of the method of the invention, the modified atmosphere in the package headspace comprises from about 9% to about 13% $O_2$ and/or from about 8% to about 12% $CO_2$ after 10 days storage at an ambient temperature. In a further aspect, the modified atmosphere in the package headspace comprises from about 10% to about 12% $O_2$ and/or from about 9% to about 11% $CO_2$ after 10 days storage at an ambient temperature. Preferably, the modified atmosphere in the package headspace comprises about 11% $O_2$ and/or from about 10% $CO_2$ after 10 days storage at an ambient temperature.

In one aspect of the method of the invention the modified atmosphere in the package headspace comprises from about 10% to about 20% $O_2$ and/or from about 1% to about 6% $CO_2$ after 10 days storage at a chilled temperature. In another aspect, the modified atmosphere in the package headspace comprises from about 16% to about 19% $O_2$ and/or from about 2% to about 5% $CO_2$ after 10 days storage at a chilled temperature.

In one aspect of the method of the invention, the incidence of rot is reduced in the fruit. The rot may be stem end rot.

In one aspect of the method of the invention, the incidence of rot is reduced by at least 50%, 60%, 70%, 80% or 90% when the fruit is stored at an ambient temperature for 3, 4, 5, 7 or 9 days and/or the incidence of rot is reduced by at least 50%, 60%, 70%, 80% or 90% when the fruit is stored at a chilled temperature for 3, 4, 5, 7 or 9 days.

In one aspect, the method of the invention further comprises a step of positioning the fruit in a holder such that the stem faces the UV light source during the treatment with UV light.

In one aspect of the method of the invention, the fruit is treated with UV light before and/or during and/or after packaging the fruit.

In one aspect of the method of the invention, the UV light is UV-C light.

In one aspect of the method of the invention, the UV light has a wavelength of between about 100 nm and about 280 nm, or between about 200 nm and about 270 nm, or between about 240 nm and about 270 nm, or between about 250 nm and about 260 nm, or about 254 nm.

In one aspect of the method of the invention, the fruit is treated with a dose of UV light in the range of about 20 mJ/cm$^2$ to about 40 mJ/cm$^2$, or about 25 mJ/cm$^2$ to about 35 mJ/cm$^2$, or about 30 mJ/cm$^2$.

In one aspect of the method of the invention, the fruit is exposed to the UV light for about 1 to about 10 seconds, or about 1 to about 5 seconds, preferably for about 3 seconds.

In one aspect of the method of the invention, the distance between the source of UV light and the fruit is about 10 mm to about 100 mm, or about 30 mm to about 70 mm, or about 50 mm.

In one aspect of the method of the invention, the packaged fruit is stored at an ambient temperature. The ambient temperature may be from about 14° C. to about 20° C., preferably from about 14° C. to about 18° C., preferably about 16° C.

In one aspect of the method of the invention, the packaged fruit is stored at a chilled temperature. The chilled temperature may be from about 3° C. to about 10° C., preferably from about 3° C. to about 7° C., preferably about 5° C.

In one aspect of the method of the invention, the MAP film is coated with an antimist composition.

In one aspect of the method of the invention, the fruit is a ready-to-eat fruit.

In one aspect of the method of the invention, the fruit is avocado.

Examples of avocado cultivar include, but are not limited to, Hass, GEM®, Fuerte, Lamb Hass, Bacon, Gwen, Pinkerton, Reed and Zutano.

In one aspect, the fruit is a Hass avocado. In one aspect, the fruit is a GEM® avocado. In another aspect, the fruit is a Fuerte avocado.

GEM® is an avocado cultivar which is available from the University of California, Riverside, Calif., USA.

In a second aspect, the present invention provides a fruit packaging apparatus having
  a) a UV light source;
  b) a fruit packer capable of packaging a fruit in a packaging film that allows the fruit to be stored in a modified atmosphere within said film;

c) a surface having a holder for the fruit movable between the UV light source and the fruit packer so that the fruit can be exposed to the UV light source and fruit packer sequentially;

wherein the packaged fruit has an increase in shelf life of at least 1 day or 2 days when it is stored at an ambient temperature and/or wherein the packaged fruit has an increase in shelf life of at least 3 days or 5 days or 7 days or 10 days when the packaged fruit is stored at a chilled temperature.

In one aspect the fruit packer is a flow wrapper.

In one aspect of the apparatus of the invention, film is a MAP film.

In one aspect of the apparatus of the invention, the holder is shaped such that the stem faces the UV light source during the treatment with UV light.

In one aspect of the apparatus of the invention the MAP film has an oxygen transmission rate (OTR) of about 20000 cc/m$^2$/day to about 80000 cc/m$^2$/day.

In one aspect of the apparatus of the invention, the MAP film has an oxygen transmission rate (OTR) of about 20000 cc/m$^2$/day to about 60000 cc/m$^2$/day. Preferably the MAP film has an oxygen transmission rate (OTR) of about 30000 cc/m$^2$/day to about 45000 cc/m$^2$/day, or about 35000 cc/m$^2$/day to about 40000 cc/m$^2$/day. More preferably the MAP film has an oxygen transmission rate (OTR) of about 38000 cc/m$^2$/day.

In one aspect of the apparatus of the invention, the modified atmosphere in the package headspace comprises from about 8% to about 17% $O_2$ and/or from about 4% to about 13% $CO_2$ after 10 days storage at an ambient temperature.

In one aspect of the apparatus of the invention, the modified atmosphere in the package headspace comprises from about 9% to about 13% $O_2$ and/or from about 8% to about 12% $CO_2$ after 10 days storage at an ambient temperature. In a further aspect, the modified atmosphere in the package headspace comprises from about 10% to about 12% $O_2$ and/or from about 9% to about 11% $CO_2$ after 10 days storage at an ambient temperature. Preferably, the modified atmosphere in the package headspace comprises about 11% $O_2$ and/or from about 10% $CO_2$ after 10 days storage at an ambient temperature.

In one aspect of the apparatus of the invention the modified atmosphere in the package headspace comprises from about 10% to about 20% $O_2$ and/or from about 1% to about 6% $CO_2$ after 10 days storage at a chilled temperature. In another aspect, the modified atmosphere in the package headspace comprises from about 16% to about 19% $O_2$ and/or from about 2% to about 5% $CO_2$ after 10 days storage at a chilled temperature.

In one aspect of the apparatus of the invention, the modified atmosphere in the package headspace comprises ozone.

DETAILED DESCRIPTION

Figure 1:
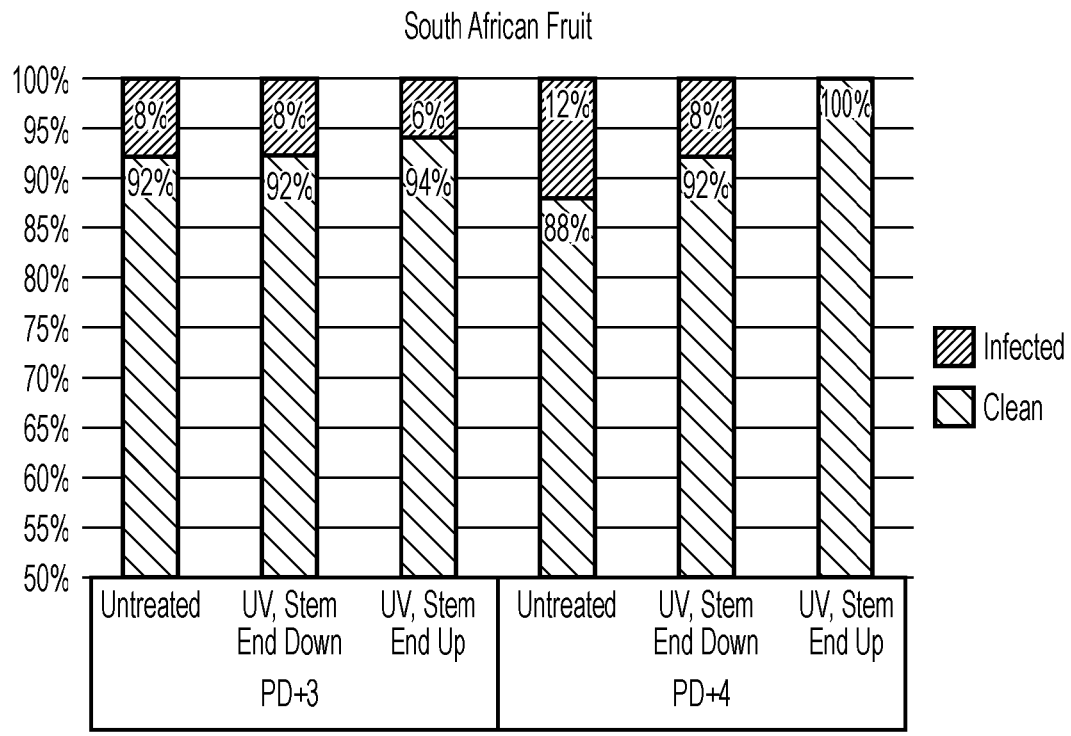
FIG. 1—the impact of stem orientation on UV treatment and incidence of stem end rot on Hass avocado; where there are two portions (and percentages) for the same bar, the upper portion (and percentage) represents "percentage infected".

The present invention provides a method for increasing the shelf life of fruit comprising the steps of:
i) treating a fruit with UV light from a UV light source,
ii) packaging the fruit in packaging film that allows the fruit to be stored in a modified atmosphere within said film, and
iii) storing the packaged fruit, wherein the method is capable of increasing the shelf life of the packaged fruit.

Sources of UV radiation or light are well known in the art, for example UV lamps or boxes. UV light denotes ultraviolet light in a wavelength range of approximately less than 310 nm. UV light is further divided into specific bands, including UV-C. UV-C denotes ultraviolet light in the C band; i.e., ultraviolet radiation having a wavelength in a range of approximately 220 to 290 nanometers (nm), and more particularly approximately 250 to 280 nm, and even more particularly approximately 265 nm. UV light is known to cause damage to DNA and through this function is able to inactivate disease causing pathogens (such as *E. coli*, for instance *E. coli* 1571) and food-spoilage microorganisms on the irradiated surface.

In one aspect, the present invention uses UV light at a wavelength of between about 100 nm and about 280 nm, or between about 200 nm and about 270 nm, or between about 240 nm and about 270 nm, or between about 250 nm and about 260 nm, or about 254 nm.

Preferably, the present invention uses UV light at a wavelength of about 254 nm.

In another aspect, the present invention further uses UV light at a wavelength of between about 100 nm and about 240 nm to generate ozone in the modified atmosphere.

It is also known that the duration of the exposure to the UV light, and the distance between the irradiated object and UV source, affects the overall dosage.

Thus in one aspect the fruit is exposed to the UV light for about 1 to about 10 seconds, or about 1 to about 5 seconds, preferably for about 3 seconds.

In another aspect, the distance between the source of UV light and the fruit is about 10 mm to about 100 mm, or about 30 mm to about 70 mm, or about 50 mm.

The air comprises about 21% oxygen and 79% nitrogen, with trace concentrations of other gases like carbon dioxide and noble gases. MAP (modified atmosphere packaging) describes any process for replacing the air in the headspace of a package with another gas or gas mixture, and is commonly used for extension of shelf life for a variety of consumable products such as fruits and vegetables.

In one aspect, the modified atmosphere used in the present invention is created by a process whereby the air in the headspace of an unsealed package is flushed with the desired gas or gas mixture before the package is sealed with the new gas or gas mixture in the package headspace.

A modified atmosphere can also be created passively when products comprising living tissue and cells (such as fruits and vegetables) are packaged. Living tissue and cells continue to respire in the package and through this biological process consume oxygen and release carbon dioxide. Packaging films can be made such that the permeability to certain gases such as oxygen is reduced or increased relative to other gases, and thus will over time alter the composition of gases in the packaging headspace when used in conjunction with a product that continues to respire. Such packaging film can be defined as "MAP film". Modifying the atmosphere in such a way to reduce the respiration of the packaged fruit can enhance the fruit's shelf life.

Thus in one aspect, the modified atmosphere used in the present invention is due to the use of a MAP film.

OTR (oxygen transmission rate) is the steady state rate at which oxygen gas permeates through a film at specified conditions of temperature and relative humidity (RH). Standard test conditions are 73° F. (23° C.) and 0% RH.

In one aspect the MAP film has an oxygen transmission rate (OTR) of about 20000 $cc/m^2/day$ to about 80000 $cc/m^2/day$. In a further aspect the MAP film has an oxygen transmission rate (OTR) of about 20000 $cc/m^2/day$ to about 60000 $cc/m^2/day$. In another aspect the MAP film has an oxygen transmission rate (OTR) of about 30000 $cc/m^2/day$ to about 45000 $cc/m^2/day$. In a further aspect, the MAP film has an oxygen transmission rate (OTR) of about 35000 $cc/m^2/day$ to about 40000 $cc/m^2/day$. Preferably the MAP film has an oxygen transmission rate (OTR) of about 38000 $cc/m^2/day$.

In one aspect the modified atmosphere in the package headspace comprises from about 8% to about 17% $O_2$ and/or from about 4% to about 13% $CO_2$ after 10 days storage at an ambient temperature. Preferably, the modified atmosphere in the package headspace comprises from about 9% to about 13% $O_2$ and/or from about 8% to about 12% $CO_2$ after 10 days storage at an ambient temperature. Preferably, the modified atmosphere in the package headspace comprises from about 10% to about 12% $O_2$ and/or from about 9% to about 11% $CO_2$ after 10 days storage at an ambient temperature. Preferably, the modified atmosphere in the package headspace comprises about 11% $O_2$ and/or from about 10% $CO_2$ after 10 days storage at an ambient temperature.

In one aspect the modified atmosphere in the package headspace comprises from about 10% to about 20% $O_2$ and/or from about 1% to about 6% $CO_2$ after 10 days storage at a chilled temperature. In another aspect, the modified atmosphere in the package headspace comprises from about 16% to about 19% $O_2$ and/or from about 2% to about 5% $CO_2$ after 10 days storage at a chilled temperature.

Shelf life can be defined as the length of time a product remains fit for sale or consumption. A number of factors can contribute to whether a product remains fit for sale or consumption. These include fruit softness, fruit flavour, fruit aroma, and development of disease such as rots.

Consequently the time it takes for the stem end rot or the signs of bruising to develop is directly related to the shelf life performance of the avocado.

Thus in one aspect the present invention may reduce the incidence of rot in the packaged fruit, in particular stem end rot. The incidence of rot on any given day post-packaging may be reduced by at least 50%, 60%, 70%, 80% or 90%. In particular, the incidence of rot in the fruit on day 9 or day 10 post packaging is reduced by at least 50%, 60%, 70%, 80% or 90%, preferably when the fruit is stored at an ambient temperature.

Stem end rot is a common rot occurring in tropical fruits such as mango and avocado. A range of different fungi can cause stem end rot including various anamorphs of *Botyosphaeria* spp., *Thyronectria pseudotrichia*, *C. gloeosporioides*, *Phomopsis perseae* Zerova and *Fusarium decemcellulare*. Other organisms, including *F. sambucinum*, *F. solani*, *Pestalotiopsis versicolor*, *Bipolaris setariae* and *Rhizopus Stolonifer* are occasionally associated with the disease. Its symptoms include the development of a dark rot from the stem end as fruit ripen after harvest. A dark brown to black rot may begin at the stem end as a dark brown ring and the rot proceeds towards the other end. The rot can produce dark streaking of the water-conducting tissues (this symptom distinguishes stem end rot from anthracnose diseases). Importantly, avocado fruit and stem-end rots are usually not obvious while fruit is on the tree. Infections usually become active after the fruit is picked and starts to soften. In particular, harvesting can injure the fruit around the button, and bacteria and fungi can enter the freshly cut stem, causing decay as fruit ripens.

In one aspect, the MAP film is coated with an antimist composition.

Antimist compositions and coatings are well known in the art. They generally comprise a surfactant which are formulated for application onto a range of surfaces, including those of films, wind shields, camera lens and binoculars. Reducing the build up of water vapour on the film can increase the attractiveness of the packaged fruit to the consumer. As used herein, the terms "antifog" and "antimist" are interchangeable.

In one aspect of the method of the invention, the fruit is a ready-to-eat fruit.

As described herein, while fruit has been traditionally packaged "unripe", there is a growing consumer demand for ripe and "ready-to-eat" fruit, such that the fruit does not require further ripening during storage by the consumer and can be consumed (with a satisfactory taste) immediately. In other words, ready-to-eat fruit has already undergone a ripening process.

Ripeness of a fruit is often measured by testing the pressure/firmness of the surface of a fruit, preferably with a penetrometer.

Suitable penetrometers are well known in the art, for example the Fruit Texture Analyser (FTA) (Ace Industrial Supplies Limited). Such penetrometers can measure using a variety of different probes and are suitable for measuring the texture of many different fruits.

Figure 13:
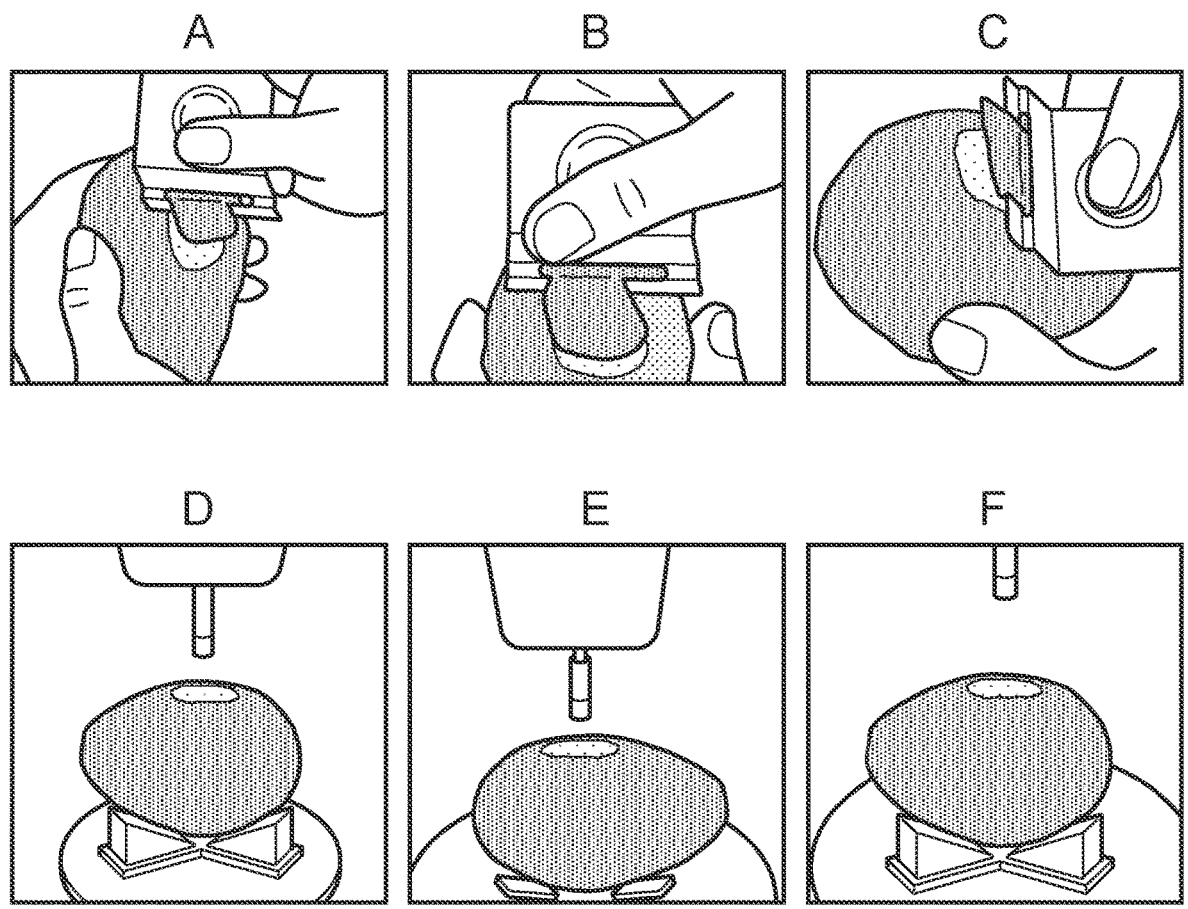
FIG. 13—panels depicting the use of a penetrometer.

In accordance with the present invention, the FTA is preferably used with a probe which measures the pressure to a depth of about 7 mm. Referring to FIG. 13, panels A-C exemplify ways in which the skin can be removed from the fruit—for example with a peeler. Preferably the peeler has no greater than a 1.5 mm depth (such that it reduces the risk of the blade digging into the fruit). The fruit should be peeled on opposite sides at the widest part of the bulb circumference such that flesh is visible on both sides. Panels D-F show the measurement of the firmness with an FTA equipped with a flat probe with a depth of about 7 mm and a diameter of about 8 mm. It is preferred to ensure that the probe penetrates the fruit at about a 90 degree angle to the surface of de-skinned area (while using the cradle to position and stabilise the fruit). Readings are taken from both deskinned sides, and are repeated to give a reading for the fruit.

Pressures for a "ready-to-eat" fruit will typically range from 0.5 lbs (0.23 kg)-8 lbs (3.63 kg), preferably in a range of 1 lb (0.45 kg)-4 lb (1.8 kg).

Figure 11:
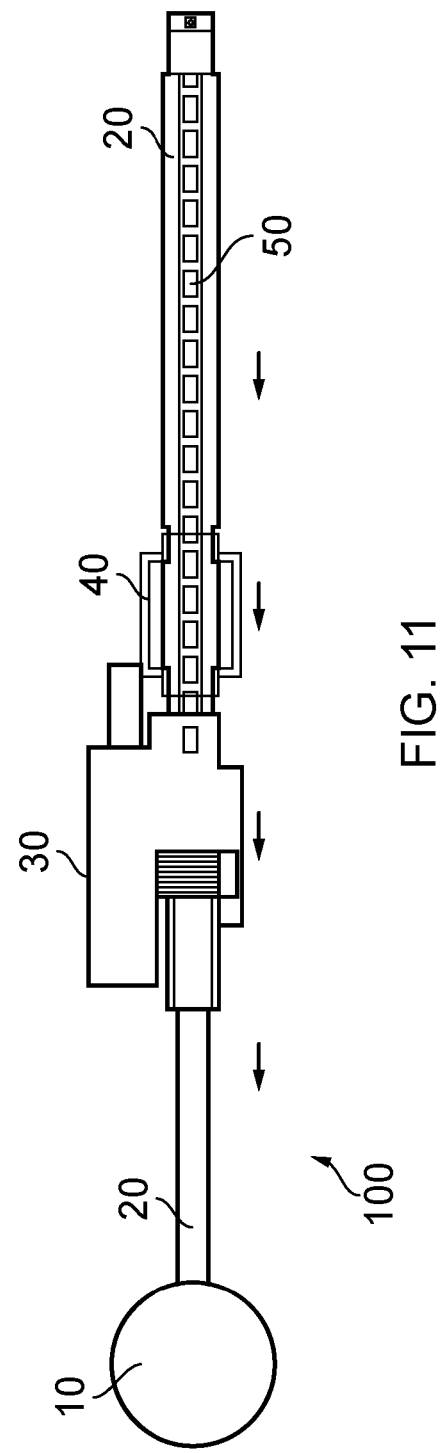
FIG. 11—an embodiment of the apparatus of the present invention.
Figure 12:
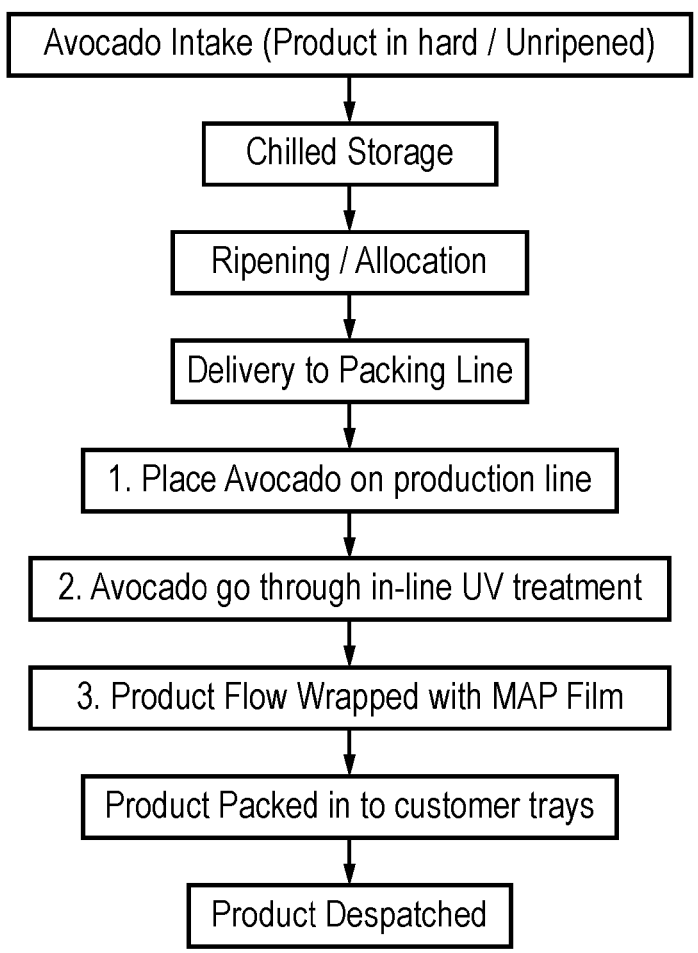
FIG. 12—an embodiment of applying the process of the present invention.

Referring now to FIG. 11, which represents an embodiment of the apparatus according to the present invention. A system (100) for fruit packaging comprises a conveyer belt (20) which traverses a UV source (40) and a fruit packer (flow wrapper) (30). The directional arrows specify the direction the conveyer belt moves, and receptacles (50) hold the fruit prior to entry into the UV source and the flow wrapper. A table (10) may store the packed fruit. FIG. 12 shows one mode of operation of the apparatus and method of the present invention (denoted by the numbered steps) shown in association with the complete process from avocado intake to product despatch to retailer.

The invention will now be further described by way of Examples, which are meant to serve to assist one of ordinary skill in the art in carrying out the invention and are not intended in any way to limit the scope of the invention.

EXAMPLES

Example 1—Assessment of Avocado Shelf Life

To validate that all product lines, to all customers, are given the appropriate amount of product shelf life. Product will be assessed daily and finding actioned upon in an appropriate manner.

Procedure

1. Collect product from each line and every depot date produced.
Quantity—Loose min 8 samples, Pre-pack—equivalent to min 8 fruit
All samples collected should be representative and meet customer specification.
2. Product is to be placed on the shelves according to the "Display Until" (DU) day (this is the day which the fruit would normally be past its optimum, and thus would be expected to see deterioration in flavour and/or texture, and possible onset of defects such as rot e.g. stem end rot)
3. Inspect daily up to DU+2 days. Visually inspect all fruit every day and cut 1 fruit per day from each sample. Fruit should be inspected for internal, external and eating quality. Quality is scored as 1-5, where 5 is clean fruit internally and externally with good taste and 1 is internal defects, skin defects and non-edible. Record any findings.
4. Product weights are taken at the start and end of the products shelf life. The weight loss is then calculated. Record all information.
5. Major issues identified during the life of the product are highlighted.

Example 2—Impact of UV Treatment on Reducing Stem End Rot in Avocados

300 Mid-season South African Hass avocado fruit were collected from a clean, evenly ripened raw material avocado pallet.

The fruit underwent UV treatment in 3 different positions: stem facing up (towards the UV source), stem facing down and with the UV light turned off.

254 nm wavelength UV light was used, with the fruit being exposed at a distance of around 50 mm away from the UV source for approximately 3 seconds.

The fruit were then packed through a punched-hole film (i.e. non-MAP film).

The packed samples were stored at ambient temperature (~18° C.) and full assessments were completed at days 3 and 4 post-packing.

The assessment included weight, pressure, gas levels, temperature, taste and quality.

Results

The results are shown in FIG. 1. To summarise, it is clear that UV can provide a beneficial effect to the shelf-life of avocado.

When ripened avocados go through UV treatment we have found fungal rots, for example stem end rot, to be reduced by up to 12%.

The positioning of the fruit clearly made a difference, as the results show that it is the correct positioning of the fruit (stem end up, facing the UV source) which gives the greatest effect.

Example 3—Impact of MAP Film Packaging on Reducing Stem End Rot in Avocados

800 Mid-season South African Hass avocado fruit were collected from a clean, evenly ripened raw material avocado pallet.

Half of the fruit underwent UV treatment with stem facing up (towards the UV source). 254 nm wavelength UV light was used, with the fruit being exposed at a distance of around 50 mm away from the UV source for approximately 3 seconds.

100 of both UV-treated and -untreated fruit were then packed with the following films:
Current Punched Hole Film
MAP X—Low Permeability Film
MAP Y—Medium Permeability Film
MAP Z—High Permeability Film
Films MAP X, MAP Y and MAP Z are available from Coveris Flexibles UK Limited. These films have an OTR in the range of 20000 to 80000 cc/m$^2$/day.

The packed fruit were divided evenly (with respect to UV treatment and packaging film) between being stored at a chilled temperature (~4° C.) and an ambient temperature (~18° C.) and full assessments were completed at days 0, 3, 4, 5 and 9 post-packing.

The assessment included weight, pressure, gas levels, temperature, taste and quality.

Results

Figure 2:
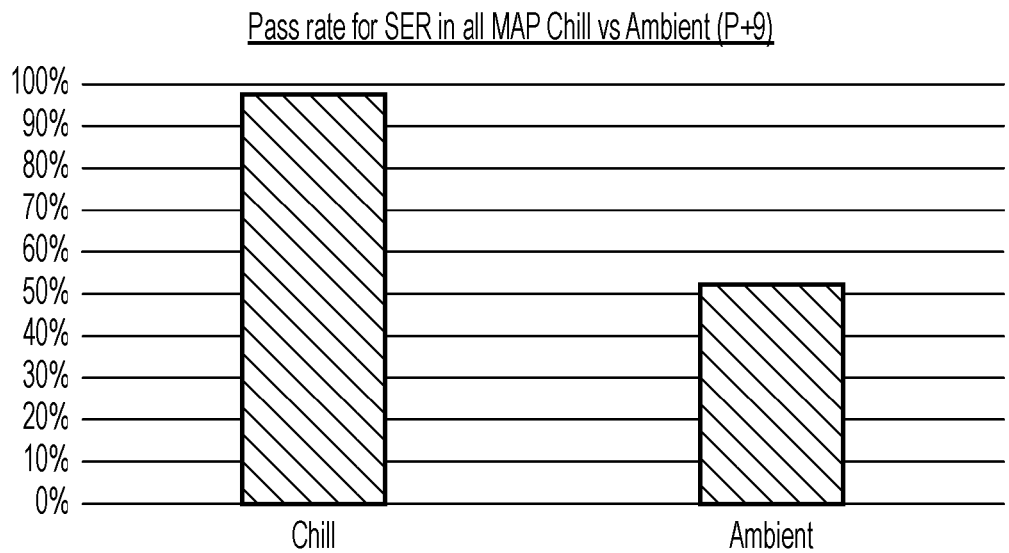
FIG. 2—the impact of storage temperature on incidence of stem end rot.
Figure 3:
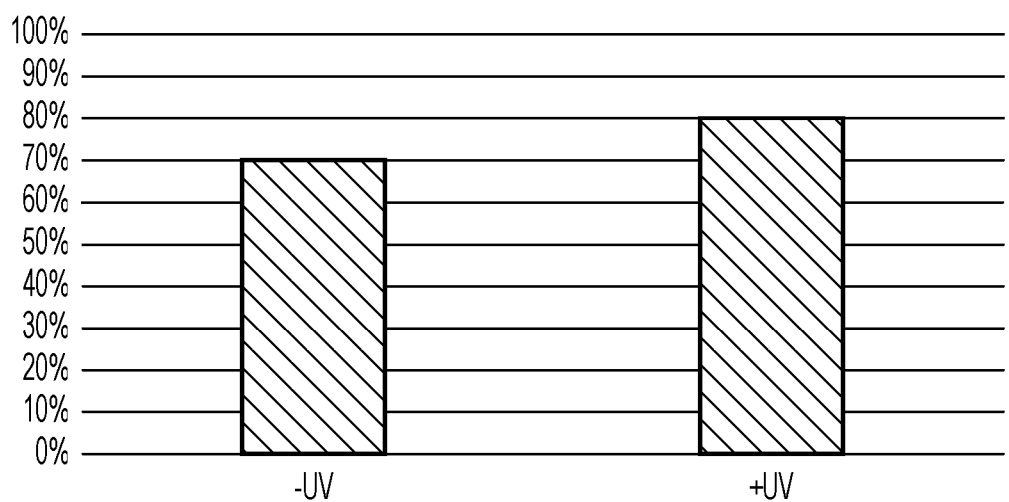
FIG. 3—the impact of UV treatment on incidence of stem end rot.
Figure 4:
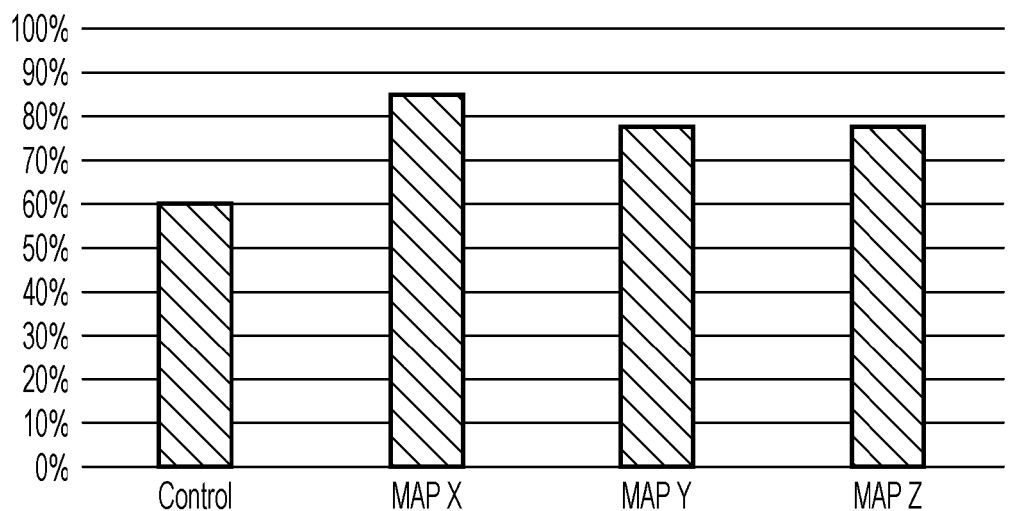
FIG. 4—the impact of different MAP film on incidence of stem end rot; control is using a standard film with punched holes.

The results are shown in FIGS. 2-4.

FIG. 2 shows the overall results for all avocados tested 9 days post-packing differentiated only by the storage temperature. 97.5% of samples stored at a chilled temperature were found to be free of Stem End Rot (SER), showing an improvement over the 52.5% achieved by avocados which were stored at an ambient temperature.

FIG. 3 shows the overall results for all avocados tested 9 days post-packing differentiated only by whether or not they were treated by UV. 80% of samples that were treated with UV were found to be free of SER, compared to 70% for those which were not treated by UV.

FIG. 4 shows the overall results for all avocados tested 9 days post-packing differentiated only by the packaging material. MAP "X" showed the lowest level of stem rot development—85% of samples packed in MAP X were found to be free of stem end rot.

As expected, storing at a lower temperature has a large positive impact on reducing SER development through life as this can reduces the rate of respiration in general, including for the organisms causing SER.

However, both MAP and UV treatment has a clear and independent effect too, and each was found to reduce the occurrence of SER by, for example, 9 days post-packing.

Example 4—The Impact of Using MAP "X" When Combining it With UV Treatment for Avocado Storage 400 Late-season South African Hass avocado fruit were collected from a clean, evenly ripened raw material avocado pallet.

All fruit underwent UV treatment with stem facing up (towards the UV source). 254 nm wavelength UV light was used, with the fruit being exposed at a distance of around 50 mm away from the UV source for approximately 3 seconds.

200 of UV-treated fruit were then packed with the following films:
Current Punched Hole Film
MAP X—Low Permeability Film The packed fruit were divided evenly (with respect to packaging film) between being stored at a chilled temperature (~4° C.) and an ambient temperature (~18° C.) and full assessments were completed at days 0, 3, 4, 5 and 9 post-packing.

The assessment included weight, pressure, gas levels, temperature, taste and quality.

Results

Figure 5:
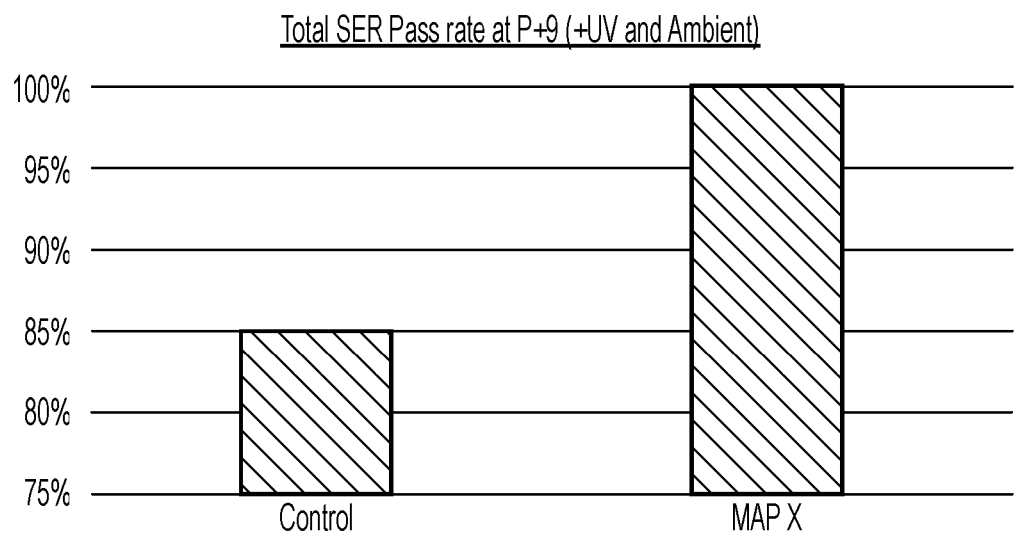
FIG. 5—the impact of using MAP X compared to using standard film with punched holes, in conjunction with UV treatment, on the incidence of stem end rot when fruit is stored at an ambient temperature.

Results are shown in FIG. 5.

FIG. 5 shows the results for all avocados tested 9 days post-packing. 100% of samples stored at an ambient temperature (~18° C.) using MAP "X" were found to be free of Stem End Rot (SER), showing an improvement over the 85% achieved by avocados which were stored using the punched hole film.

Together, this shows the synergistic effect of combining the two methods at when avocados are stored at an ambient temperature, neither of were able to achieve 100% removal of SER on their own.

Example 5—Investigation of the Punched-Holes vs. Low Permeability MAP Film on the Quality of Hass Avocados Early-season Chilean Hass avocado fruit were packed with in accordance with the following:
Current Punched Hole Film
MAP X—Low Permeability Film
MAP X—Low Permeability Film with a clamshell tray These were then stored at a chilled (in a refrigerated cabinet at 5° C.±2° C.) and ambient (in a humidity cabinet at 16° C.±2° C.) temperature profile throughout shelf life (10 days post packing).

The table below provides details of the tray which was used in this experiment.

However, similar trays are known to exist which would provide a similar protective function.

| Nominal Capacity: | Twin Avocado Hinged Tray |
|---|---|
| Dimensions: Length & Width | 200 mm × 178 mm |
| Height: | 31 mm (OPEN DEPTH) |
| Material: | RPET (250), Antifog - both sides |
| Weight: | 11 g +/− 10% |
| Carton Size: | 585 × 290 × 325 mm |
| Pallet Size: | 1020 mm × 1200 mm |
| Quantity per Carton: | 780 |
| Cartons per Layer: | 6 |
| Layers per Pallet: | 4 |
| Total Pieces per Pallet | 18,720 |

Shelf Life Testing

Headspace oxygen and carbon dioxide were measured daily in the packs using an Emco Technologies Stratos gas analyser. Gas-tight self-sealing silicon septa (Toray Engineering) were used to allow repeat measurements to be obtained from the same pack.

Packs were opened throughout shelf life, and the following analysis has been carried out on these opened packs:
Texture Analysis with FTA.

Sensory observation: Taste, aroma, texture/mouthfeel, and internal/external visual impressions will be recorded by a small, experienced sensory panel (n=3). An overall organoleptic score will be given, to reflect the customer's evaluation scale. 0=poor, 1=average, 2=good, 3=excellent. Visual cues will be skin condition and internal flesh colour (absence of browning). Aroma cues will be whether there is a fresh avocado aroma, or whether there is any sign of fermentation, i.e. an 'alcoholic' or 'nail varnish' aroma. Flavour will be evaluated against the target of a fresh, avocado flavour, with a nutty note, and no off flavours (no rancid/strong soapy flavour). Texture cues will be a good, soft, creamy flesh (not hard/too firm), but not mushy.

Results

Figure 10:
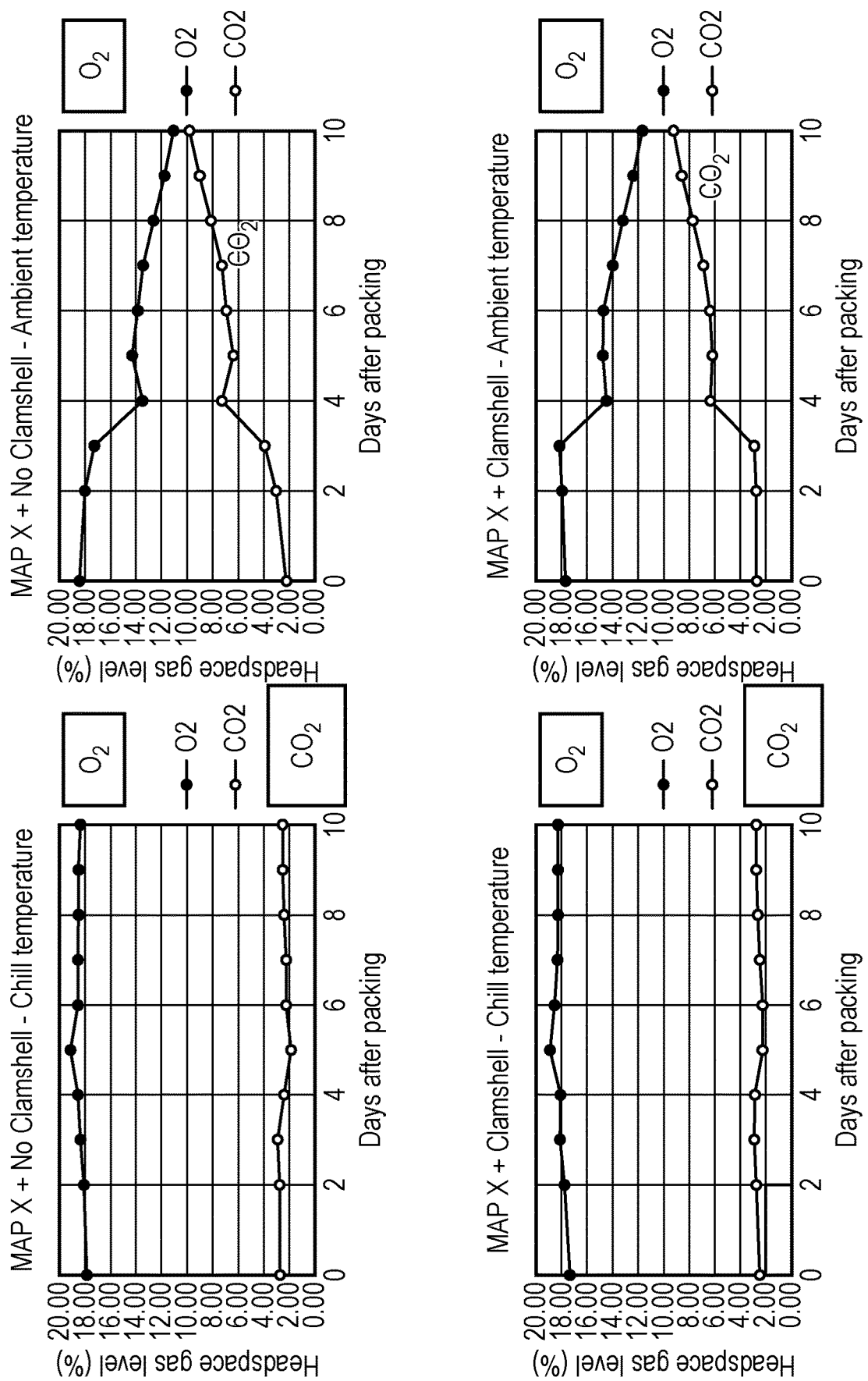
FIG. 10—packaging headspace gas levels; in each panel, the upper line represents $O_2$ concentration.

Gas levels in the packs stored at chill temperature were only slightly modified throughout shelf life. The temperature profile concerning the avocadoes stored at ambient condition was the following: 3 days at chilled temperature due to the issue with the humidity cabinet and the remained days of shelf life at ambient condition. Enhancing the storage temperature led to an increase in respiration rate, and thus a higher modification in headspace gas levels within the pack was seen. At the end of shelf life, $O_2$ and $CO_2$ levels were at ~11% and ~10%, respectively (FIG. 10). The clamshell did not appear to affect the gas levels to any significant degree. (At the end of shelf life, $O_2$ and $CO_2$ levels were at 11-12% and ~9%, respectively—FIG. 10)

Sensory Observations
Stem End Rots

| CHILL | Rots (%) | | | | |
|---|---|---|---|---|---|
| Days after packing (P+) | 0 | 4 | 5 | 6 | 10 |
| Control | 0 | 0 | 0 | 0 | 5 |
| MAP X + Clamshell | 0 | 0 | 0 | 0 | 0 |
| MAP X + No Clamshell | 0 | 5 | 0 | 0 | 0 |

| AMBIENT | Rots (%) | | | | |
|---|---|---|---|---|---|
| Days after packing (P+) | 0 | 4 | 5 | 6 | 10 |
| Control | 0 | 0 | 0 | 5 | 60 |
| MAP X + Clamshell | 0 | 0 | 0 | 5 | 20 |
| MAP X + No Clamshell | 0 | 0 | 20 | 0 | 30 |

Bruises

| CHILL | Bruises (%) | | | | |
|---|---|---|---|---|---|
| Days after packing (P+) | 0 | 4 | 5 | 6 | 10 |
| Control | 0 | 0 | 5 | 0 | 0 |
| MAP X + Clamshell | 0 | 5 | 15 | 10 | 0 |
| MAP X + No Clamshell | 0 | 10 | 5 | 10 | 0 |

| AMBIENT | Bruises (%) | | | | |
|---|---|---|---|---|---|
| Days after packing (P+) | 0 | 4 | 5 | 6 | 10 |
| Control | 0 | 0 | 0 | 0 | 65 |
| MAP X + Clamshell | 0 | 0 | 0 | 10 | 10 |
| MAP X + No Clamshell | 0 | 10 | 15 | 10 | 30 |

Figure 6:
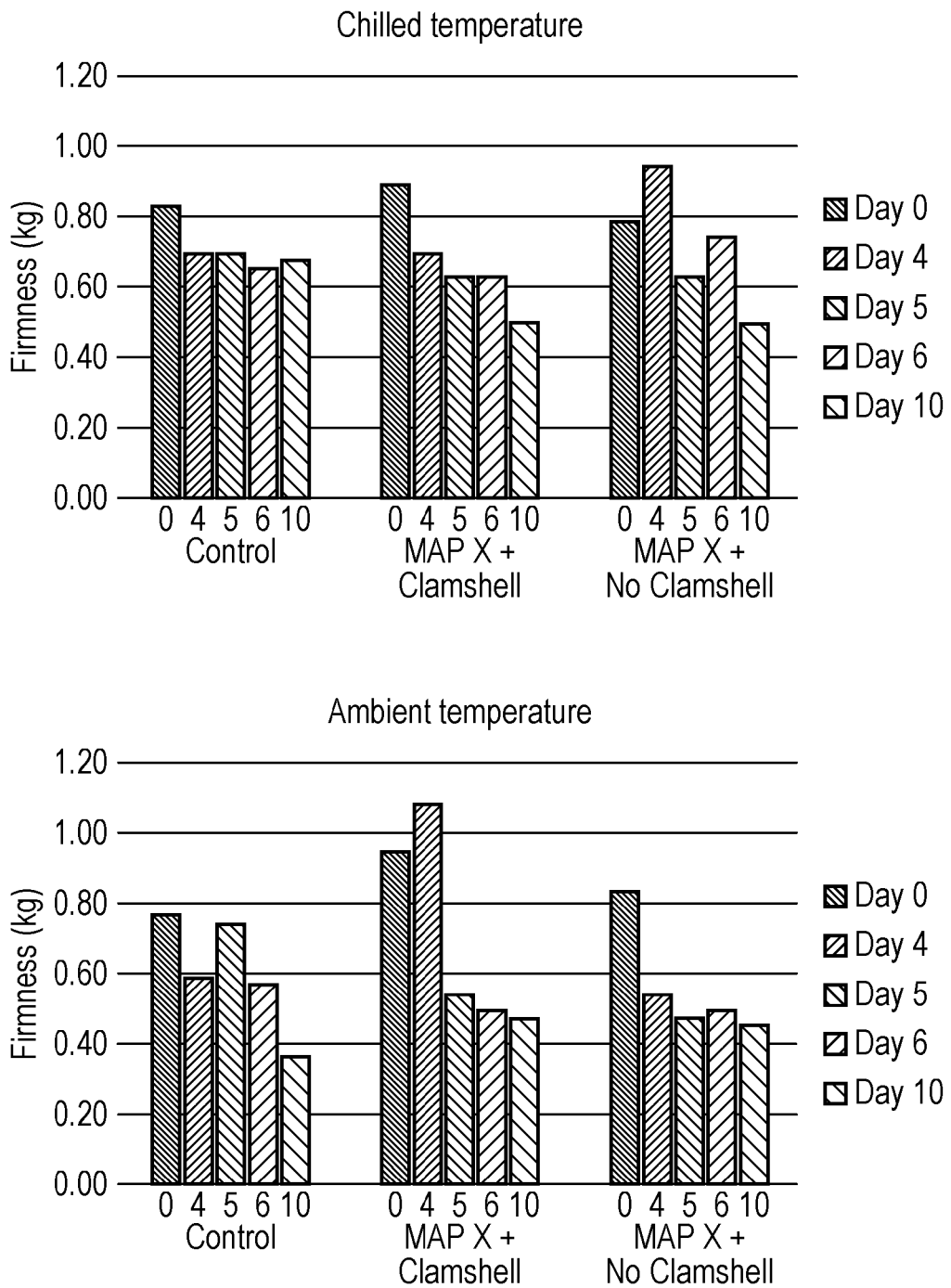
FIG. 6—the impact of using MAP X packaging (with and without clamshell) on fruit firmness through product shelf life; for each condition, bars represent (from left to right): Day 0, Day 4, Day 5, Day 6, Day 10 after packing. The days are shown under each bar on the graph.
Figure 7:
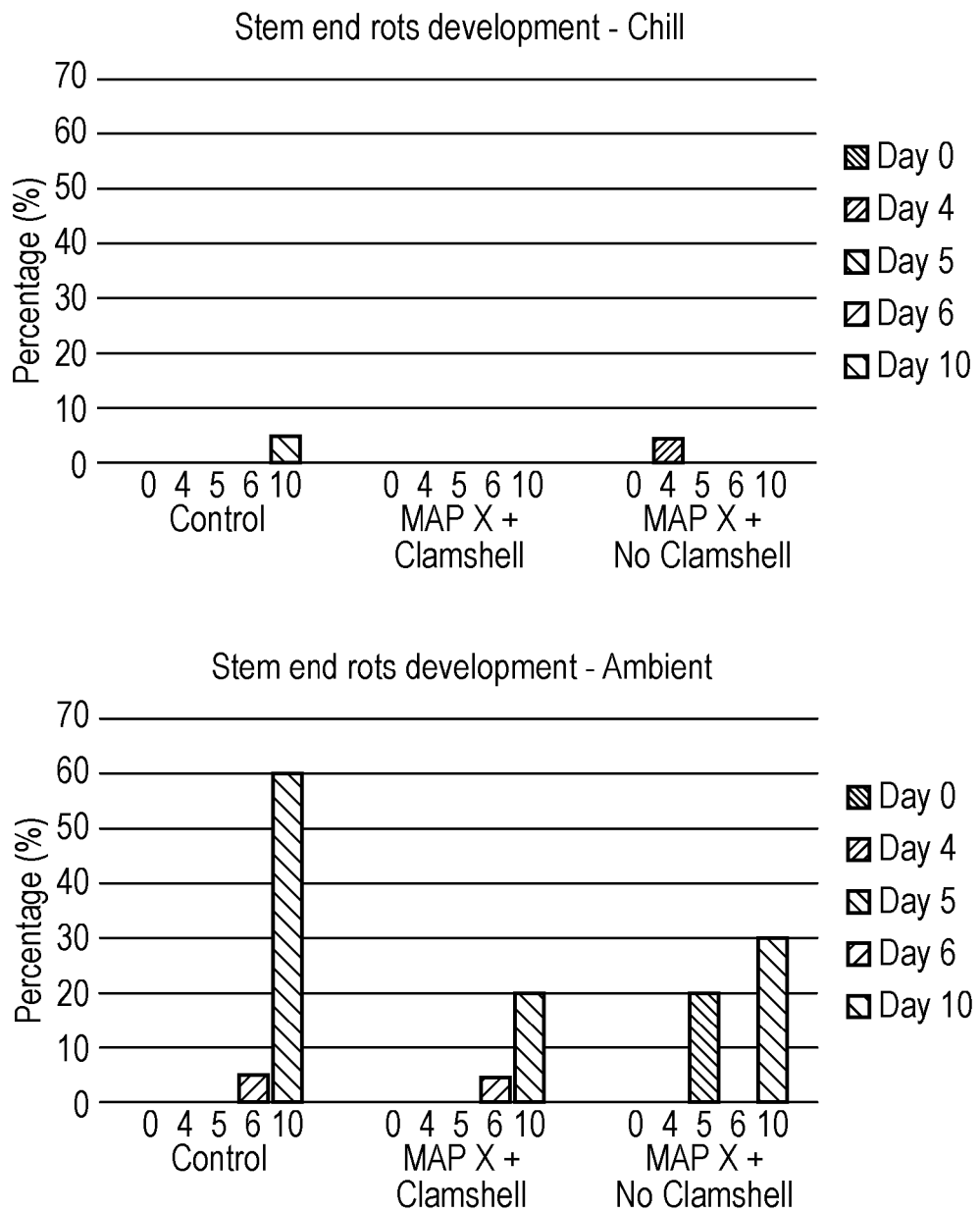
FIG. 7—the impact of using MAP X packaging (with and without clamshell) on stem end root development through product shelf life; for each condition, bars represent (from left to right): Day 0, Day 4, Day 5, Day 6, Day 10 after packing. The days are shown under each bar on the graph.
Figure 8:
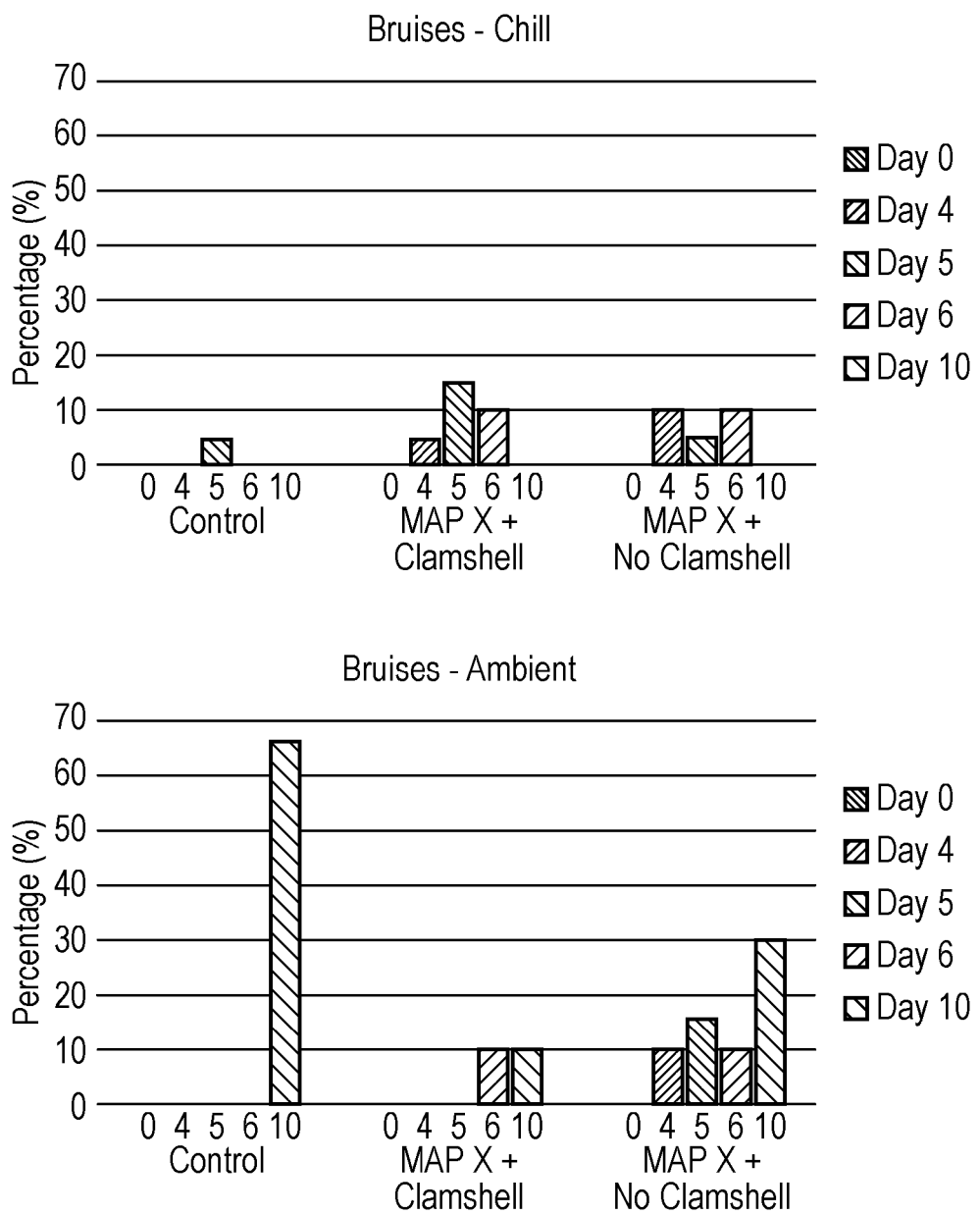
FIG. 8—the impact of using MAP X packaging (with and without clamshell) on fruit bruising through product shelf life; for each condition, bars represent (from left to right): Day 0, Day 4, Day 5, Day 6, Day 10 after packing. The days are shown under each bar on the graph.

The results are graphically presented on FIGS. 6-8.

Statistical Analysis

A $\chi^2$ (Chi-Squared) test was performed to examine the benefit of MAP X over Control packs for stem end rot. The data collected on the avocados stored at ambient temperature were used for performing the statistical analysis.

The null hypothesis ($H_0$) assumes that the MAP X has no effect in reducing/slowing down Stem-End-Rot (SER) development, whilst the alternative ($H_1$) means that there is. If the null hypothesis is not satisfied, the test will confirm that the MAP X has a significant effect in reducing the SER development. The statistical analysis was conducted on the results obtained from Day 6 and Day 10 post-packing.

Day 6

| Observed values (N) | | | |
|---|---|---|---|
| | MAP X + No clamshell | MAP X + Clamshell | Total |
| SER | 0 | 1 | 1 |
| No SER | 10 | 9 | 19 |
| Total | 10 | 10 | 20 |

| Expected Values (N) | | | |
|---|---|---|---|
| | Control | Control | Total |
| SER | 1 | 1 | 2 |
| No SER | 9 | 9 | 18 |
| Total | 10 | 10 | 20 |

| Frequency | | | |
|---|---|---|---|
| | MAP X + No clamshell | MAP X + Clamshell | Total |
| SER | 1 | 0 | 1 |
| No SER | 0.11 | 0 | 0.11 |
| | | $\chi^2$ | 1.11 |

| | | | |
|---|---|---|---|
| α | 0.05 | | |
| df | 1 | | |
| $\chi^2$ exp | 1.11 | | |
| p-value | 0.29 | | |
| $\chi^2$ critical | 3.841 | | |
| Significant | NO | $H_0$ accepted | |

N = number of avocados

Day 10

| Observed values (N) | | | |
|---|---|---|---|
| | MAP X + No clamshell | MAP X + Clamshell | Total |
| SER | 3 | 2 | 5 |
| No SER | 7 | 8 | 15 |
| Total | 10 | 10 | 20 |

| Expected Values (N) | | | |
|---|---|---|---|
| | Control | Control | Total |
| SER | 6 | 6 | 12 |
| No SER | 4 | 4 | 8 |
| Total | 10 | 10 | 20 |

| Frequency | | | |
|---|---|---|---|
| | MAP X + No clamshell | MAP X + Clamshell | Total |
| SER | 1.5 | 2.67 | 4.17 |
| No SER | 2.25 | 4 | 6.25 |
| | | $\chi^2$ | 10.42 |

| | | | |
|---|---|---|---|
| α | 0.05 | | |
| df | 1 | | |
| $\chi^2$ exp | 10.42 | | |
| p-value | 0.001247 | | |
| $\chi^2$- crit | 3.841 | | |
| Significant | YES | $H_0$ rejects = $H_1$ Accepts | |

Discussion

Figure 9:
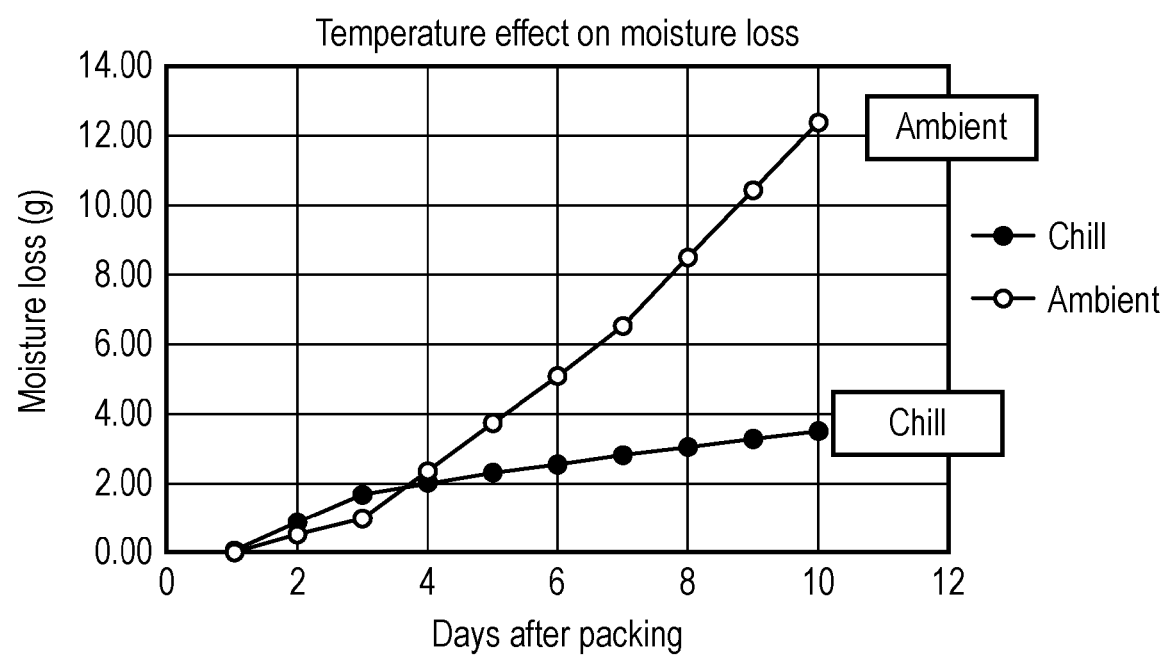
FIG. 9—the impact of temperature on moisture loss from control film (punched hole); after 10 days, storage at an ambient temperature led to the greatest moisture loss.

In the punch perforated film, the moisture loss increased with the time-temperature increase. (FIG. 9).

Regarding the MAP films, the gas levels in the packs stored at chill temperature were only slightly modified throughout shelf life. The temperature profile concerning the avocadoes stored at ambient condition was as follows: 3 days at chilled temperature due to the issue with the humidity cabinet and the remaining days of shelf life at ambient condition. Enhancing the storage temperature led to an increase in respiration rate, and thus a higher modification in headspace gas levels within the pack was seen. At the end of shelf life, $O_2$ and $CO_2$ levels were at ~11% and ~10%, respectively.

The texture and sensory analysis were conducted simultaneously on days 0, 4, 5, 6 and 10. Results from the texture analysis indicated that the avocados became softer with the time-temperature increase. Regarding the sensory evaluation, the avocados tasted good throughout shelf life, with no after taste and no off-odour development when opening the packs. Decay, such as bruises and stem end rots, were seen from 5/6 days post-packing onwards.

Besides the temperature effect on the deterioration/ageing process, the MAP film paired with/without clamshell did slow down the stem end rots development by 50-60%, compared to the control pack. Bruises observed in this trial was mainly caused by handling prior to packing. However, the trend indicated that the presence of the clamshell punnet did protect the fruits during transit and storage. Minor moisture in-pack were seen in the MAP film paired with or without clamshell punnets from 5/6 days post-packing onwards.

A $\chi^2$ (Chi-Squared) test was performed to examine the benefit of MAP X over Control packs. The data collected on the avocados stored at ambient temperature were used for performing the statistical analysis. Overall, the difference from control diverged to a greater degree as shelf life progressed. By Day 10, the null hypothesis was rejected, and the MAP X data was shown to be significantly different from the Control data ($\chi^2 exp > \chi^2 critical$), and showed a statistically significant advantage to the MAP X vs. Control Punched film.

Example 6—Investigation of the MAP Film Performance on the Quality of Fuerte Avocados The benefits of packing Fuerte avocados in an MAP (Modified Atmosphere Packaging) film (MAP X) paired with UV pre-treatment have been investigated.

The modified atmosphere packaging technology slowed down the respiration rate of the avocado fruits, as well as the development of stem end rots without comprising quality and flavour.

Method

Fuerte avocados were packed in (i) punch perforated film (controls) or (ii) in the MAP X packaging paired with UV pre-treatment.

Half of the samples were stored at ambient temperature (16±2° C.) and the other half were stored at chill temperature (5±2° C.) for 10 days. Headspace oxygen and carbon dioxide were measured daily in the packs using an Emco Technologies Stratos gas analyser. Gas-tight self-sealing silicon septa (Toray Engineering) were used to allow repeat measurements to be obtained from the same pack.

Packs were opened throughout shelf life, and sensory observations (Taste, aroma, texture/mouthfeel, and internal/external visual impressions) were carried out.

Results

Figure 14:
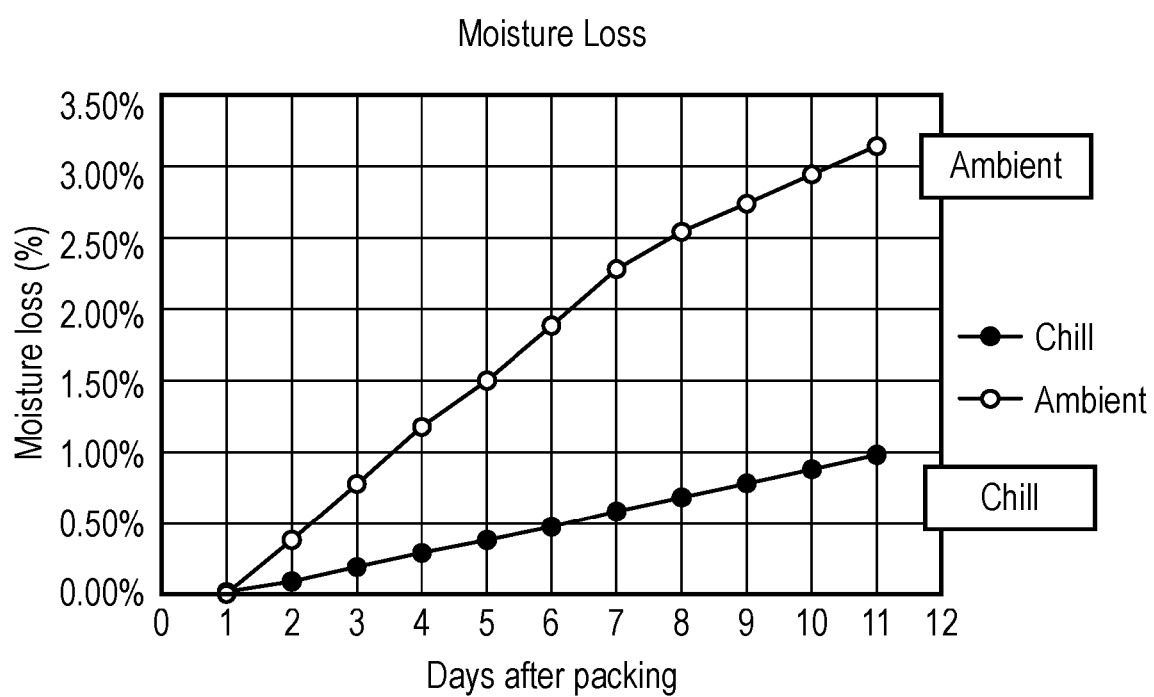
FIG. 14—Moisture loss of control packs.

FIG. 14 shows the moisture loss in the controls at ambient and chilled temperatures.

Figure 15A:
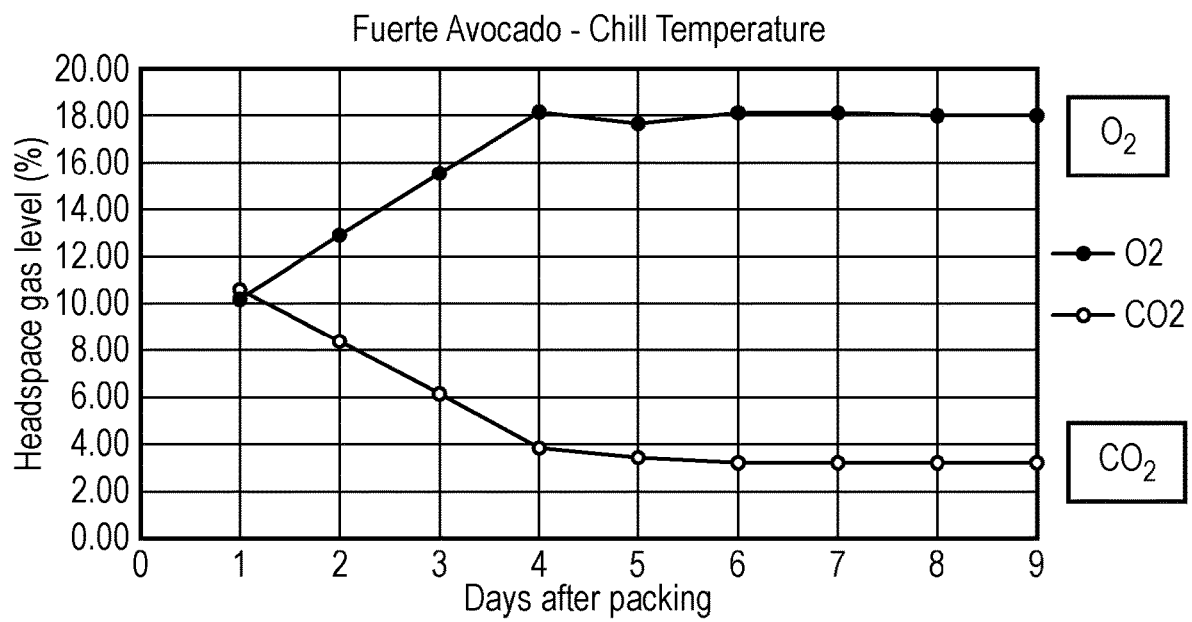
FIGS. 15a and b—headspace gas levels (MAP film) at chilled temperatures and ambient temperatures.
Figure 15B:
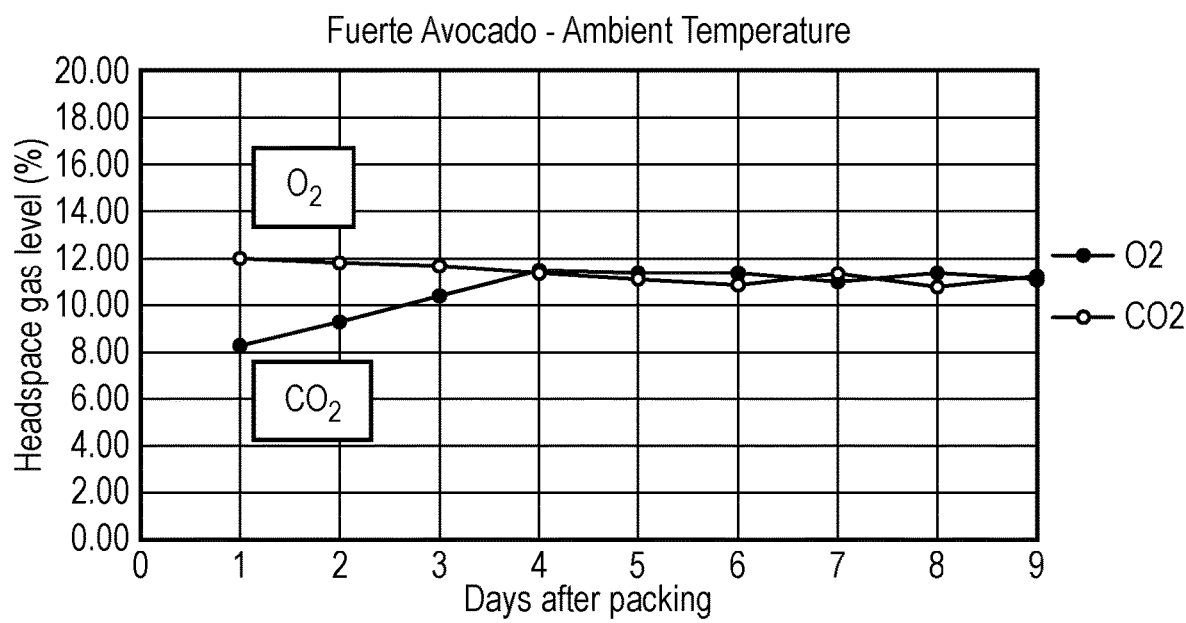

FIG. 15a and FIG. 15b show the headspace gas levels (MAP film)

The residual oxygen and carbon dioxide levels of the samples stored at ambient temperature were modified, with ~11% $O_2$ and ~11% $CO_2$ recorded throughout shelf life testing. As for the packs stored at chill temperature, the equilibrium oxygen and carbon dioxide levels were found to be at approximately 18% and 3-4%, respectively.

Figure 16:
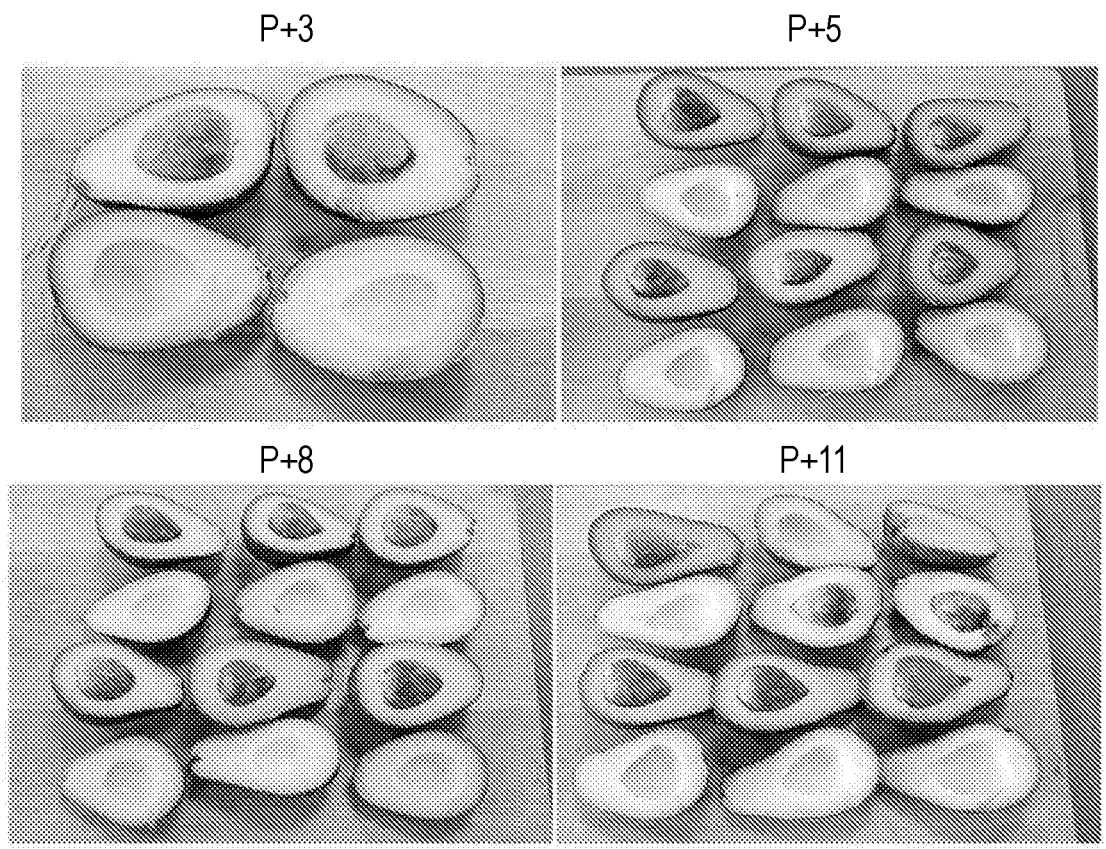
FIG. 16—Control packs stored at chilled temperature, P+ denotes days after packing.

Control Packs Stored at Chilled Temperature:

The avocado packs of the control stored at chill temperature looked good until the end of testing (see FIG. 16).

Figure 17:
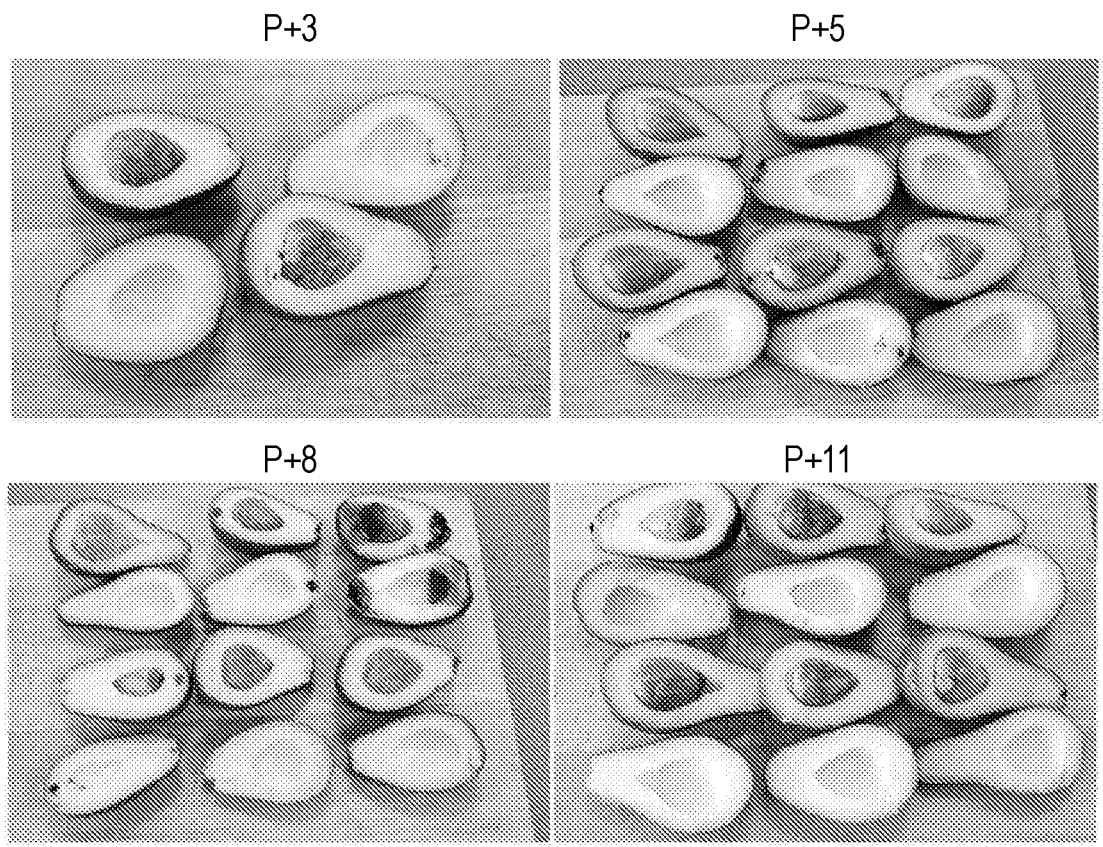
FIG. 17—control packs stored at ambient temperature, P+ denotes days after packing.

Controlled Packs Stored at Ambient Temperature:

In connection to the avocado packs of the control stored at ambient temperature, stem end rot development was observed from P+5, with heavy discolouration being visualised on two avocadoes at P+3 (see FIG. 17). No off-odour development was observed when opening the packs.

Figure 18:
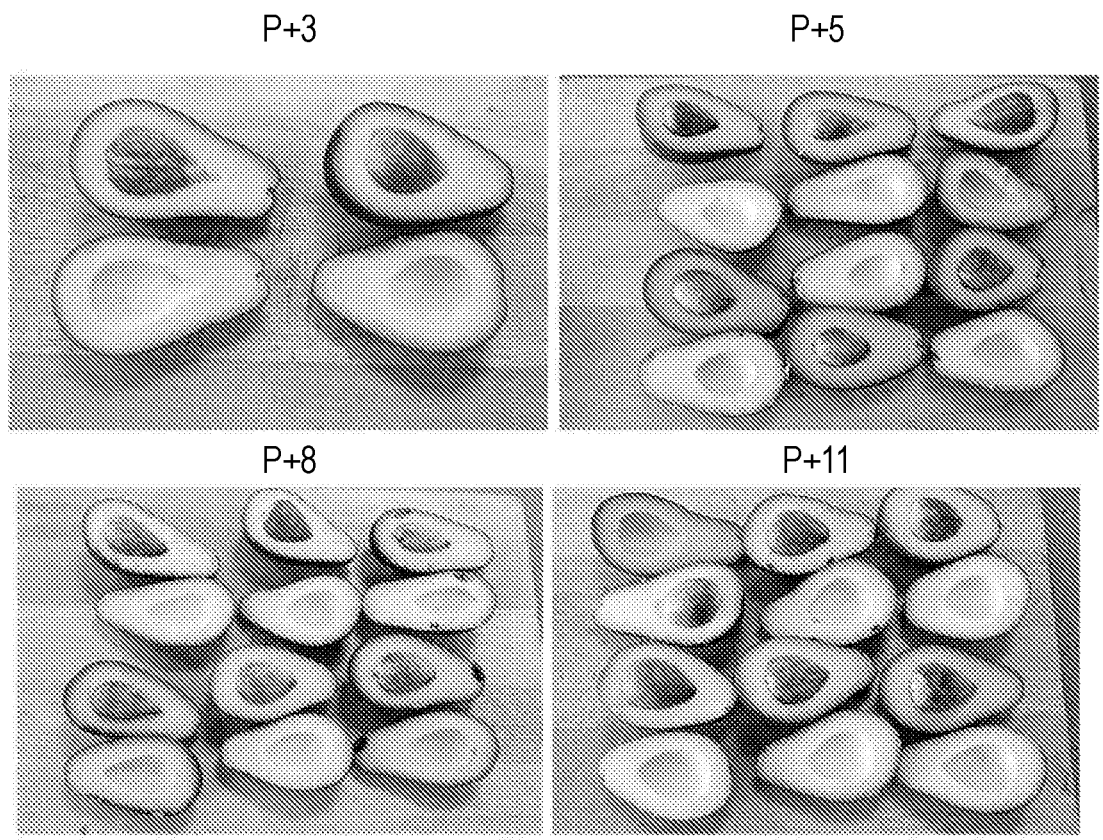
FIG. 18—MAP X and UV treatment at chilled temperature, P+ denotes days after packing.

MAP X+UV Treatment Stored at Chilled Temperature:

The avocados (which had undergone MAP X and UV treatment) stored at chill temperature looked good. Some minor stem issues and a couple instances of small bruising was observed on the flesh of a few avocados half way through testing (FIG. 18) however, due to the variability in the nature of the raw starting materials, the bruising and stem issues are within acceptable limits and would have been more extensive if MAP X and UV treatment had not been used. No mould growth and no off-odour development were visualised throughout shelf life testing.

Figure 19:
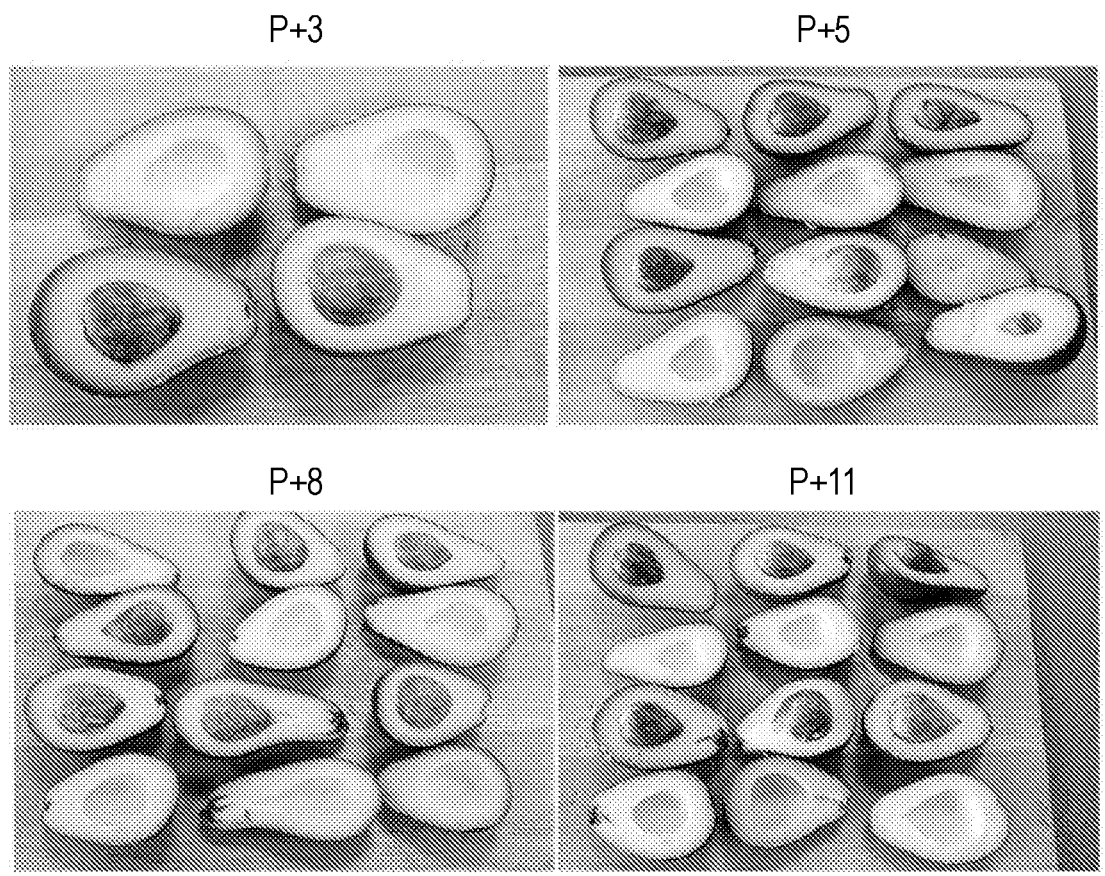
FIG. 19—MAP X and UV treatment at ambient temperature, P+ denotes days after packing.

MAP X+UV Treatment Stored at Ambient Temperature:

The avocados (which had undergone MAP X and UV treatment) stored at ambient temperature looked good throughout the shelf life trial, although several instances of stem end rots development was spotted from P+8 (FIG. 19). No off-odour development was observed when opening the packs.

Summary:

MAP X and UV treatment is found to be optimal for storing the Fuerte variety (cultivar) avocados at chilled temperature.

SUMMARY PARAGRAPHS

The present invention is defined in the claims and the accompanying description.

For convenience other aspects of the present invention are presented herein by way of numbered paragraphs.

1. A method for increasing the shelf life of fruit comprising the steps of:
  i) treating a fruit with UV light from a UV light source,
  ii) packaging the fruit in packaging film that allows the fruit to be stored in a modified atmosphere within said film, and
  iii) storing the packaged fruit,
wherein the method is capable of increasing the shelf life of the packaged fruit by at least 1 day or 2 days when the packaged fruit is stored at an ambient temperature and/or wherein the method is capable of increasing the shelf life of the packaged fruit by at least 5 days or 7 days or 10 days when the packaged fruit is stored at a chilled temperature.

2. The method according to paragraph 1, wherein the film is a modified atmosphere packaging (MAP) film.

3. The method according to paragraph 1 or 2, wherein the modified atmosphere has a reduced $O_2$ concentration compared to the environment surrounding the packaged fruit.

4. The method according to any one of paragraphs 1 to 3, wherein the modified atmosphere has an increased $CO_2$ concentration compared to the environment surrounding the packaged fruit.

5. The method according to any one of paragraphs 1 to 4, wherein the modified atmosphere comprises ozone.

6. The method according to paragraph 5, comprising a further step of introducing ozone into the modified atmosphere.

7. The method according to any one of paragraphs 2 to 6 wherein said MAP film has an oxygen transmission rate (OTR) of about 20000 cc/m$^2$/day to about 60000 cc/m$^2$/day.

8. The method according to any one of paragraphs 1 to 7 wherein the modified atmosphere comprises from about 8% to about 17% $O_2$ and/or from about 4% to about 13% $CO_2$ after 10 days storage at an ambient temperature.

9. The method according to any one of paragraphs 1 to 8, wherein the incidence of rot is reduced in the fruit.

10. The method according to paragraph 9 wherein the rot is stem end rot.

11. The method according to paragraph 10, wherein the incidence of rot is reduced by at least 50%, 60%, 70%, 80% or 90% when the fruit is stored at an ambient temperature for 3, 4, 5, 7 or 9 days and/or wherein the incidence of rot is reduced by at least 50%, 60%, 70%, 80% or 90% when the fruit is stored at a chilled temperature for 3, 4, 5, 7 or 9 days.

12. The method according to paragraph 10 or 11, further comprising a step of positioning the fruit in a holder such that the stem faces the UV light source during the treatment with UV light.

13. The method according to any one of paragraphs 1 to 12 wherein the fruit is treated with UV light before and/or during and/or after packaging the fruit.

14. The method according to any one of paragraphs 1 to 13 wherein the UV light is UV-C light.

15. The method according to any one of paragraphs 1 to 14 wherein the UV light has a wavelength of between about 100 nm and about 280 nm, or between about 200 nm and about 270 nm, or between about 240 nm and about 270 nm, or between about 250 nm and about 260 nm, or about 254 nm.

16. The method according to any one of paragraphs 1 to 15 wherein the fruit is treated with a dose of UV light in the range of about 20 mJ/cm$^2$ to about 40 mJ/cm$^2$, or about 25 mJ/cm$^2$ to about 35 mJ/cm$^2$, or about 30 mJ/cm$^2$.

17. The method according to any one of paragraphs 1 to 16 wherein the fruit is exposed to the UV light for about 1 to about 10 seconds, or about 1 to about 5 seconds, preferably for about 3 seconds.

18. The method according to any one of paragraphs 1 to 17 wherein the distance between the source of UV light and the fruit is about 10 mm to about 100 mm, or about 30 mm to about 70 mm, or about 50 mm.

19. The method according to any one of paragraphs 1 to 18 wherein the packaged fruit is stored at an ambient temperature.

20. The method according to paragraph 19 wherein the ambient temperature is from about 14° C. to about 20° C., preferably from about 14° C. to about 18° C., preferably about 16° C.

21. The method according to any one of paragraphs 1 to 20 wherein the packaged fruit is stored at a chilled temperature.

22. The method according to paragraph 21 wherein the packaged fruit is stored at about 3° C. to about 10° C., preferably about 3° C. to about 7° C., preferably about 5° C.

23. The method according to any one of paragraphs 1 to 22 wherein said MAP film is coated with an antimist composition.

24. The method according to any one of paragraphs 1 to 23 wherein the fruit is a ready-to-eat fruit.

25. The method according to any one of paragraphs 1 to 24 wherein the fruit is avocado.

26. A fruit prepared by the method according to any one of the preceding paragraphs.

27. A fruit packaging apparatus having
a) a UV light source;
b) a fruit packer capable of packaging a fruit in a packaging film that allows the fruit to be stored in a modified atmosphere within said film;
c) a surface for holding the fruit wherein the surface is movable between the UV light source and the fruit packer so that the fruit can be exposed to the UV light source and fruit packer sequentially;
wherein the packaged fruit has an increase in shelf life of at least 1 day or 2 days when it is stored at an ambient temperature and/or
wherein the packaged fruit has an increase in shelf life of at least 5 days or 7 days or 10 days when the packaged fruit is stored at a chilled temperature.

28. The apparatus according to paragraph 27, wherein the film is a MAP film.

29. The apparatus according to paragraph 27 or 28, wherein the fruit is held such that the stem faces the UV light source during the treatment with UV light.

30. The apparatus according to any one of paragraphs 27 to 29 wherein said MAP film has an oxygen transmission rate (OTR) of about 20000 cc/m$^2$/day to about 60000 cc/m$^2$/day.

31. The apparatus according to any one of paragraphs 27 to 30 wherein the modified atmosphere comprises from about 8% to about 17% $O_2$ and/or from about 4% to about 13% $CO_2$ after 10 days storage at an ambient temperature.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in molecular biology, cellular immunology or related fields are intended to be within the scope of the following claims.

The invention claimed is:

1. A method for increasing the shelf life of fruit comprising the steps of:
   i) treating a fruit with UV light from a UV light source;
   ii) packaging the fruit in packaging film that allows passive permeability of gases and storage of the fruit to be stored in a modified atmosphere within the film; wherein the modified atmosphere comprises from 8% to 17% $O_2$ and from 4% to 13% $CO_2$ after 10 days storage at an ambient temperature, wherein the ambient temperature is from 14° C. to 20° C.; and wherein the modified atmosphere comprises ozone; and
   iii) storing the packaged fruit;
   wherein the shelf life of the packaged fruit is increased by at least one day when the packaged fruit is stored at an ambient temperature, wherein the ambient temperature is from 14° C. to 20° C.; and/or
   wherein the shelf life of the packaged fruit is increased by at least five days when the packaged fruit is stored at a chilled temperature, wherein the chilled temperature is from 3° C. to 10° C.;
   wherein the film is a modified atmosphere packaging (MAP) film having an oxygen transmission rate (OTR) of 20000 cc/m$^2$/day to 60000 cc/m$^2$/day;
   wherein the fruit is avocado; and
   wherein the fruit is treated with UV light before packaging the fruit.

2. The method of claim 1, wherein the incidence of rot is reduced in the fruit.

3. The method of claim 2,
   wherein the incidence of rot is reduced by at least 50% when the fruit is stored at the ambient temperature for three days; and/or wherein the incidence of rot is reduced by at least 50% when the fruit is stored at the chilled temperature for three days.

4. The method of claim 1, further comprising a step of positioning the fruit in a holder such that the stem faces the UV light source during the treatment with UV light.

5. The method of claim 1, wherein the MAP film is coated with an antimist composition.

6. The method of claim 1, wherein the fruit is a ready-to-eat fruit.

7. The method of claim 1, wherein the modified atmosphere has a reduced $O_2$ concentration and/or an increased $CO_2$ concentration compared to the environment surrounding the packaged fruit.

8. The method of claim 1, wherein the method comprises a further step of introducing ozone into the modified atmosphere.

9. The method of claim 2, wherein the rot is stem end rot.

10. The method of claim 1, wherein:
the UV light is UV-C light;
the UV light has a wavelength of between about 100 nm and about 280 nm;
the dose of UV light is in the range of about 20 mJ/cm$^2$ to about 40 mJ/cm$^2$;
the fruit is exposed to the UV light for about 1 to about 10 seconds; and/or
the distance between the source of UV light and the fruit is about 10 mm to about 100 mm.

* * * * *